(12) United States Patent
Thurlow et al.

(10) Patent No.: US 9,721,456 B2
(45) Date of Patent: Aug. 1, 2017

(54) PERSONAL HAZARD DETECTION SYSTEM WITH REDUNDANT POSITION REGISTRATION AND COMMUNICATION

(71) Applicant: Universal Site Monitoring Unit Trust, Darwin NT (AU)

(72) Inventors: Andrew Charles Thurlow, Muirhead (AU); Emil William Tastula, Ludmilla (AU); Timothy Clinton Earl, Winnellie (AU)

(73) Assignee: Universal Site Monitoring Unit Trust, Darwin NT (AU)

(*) Notice: Subject to any disclaimer, the term of this patent is extended or adjusted under 35 U.S.C. 154(b) by 0 days.

(21) Appl. No.: 15/323,136

(22) PCT Filed: Jul. 2, 2015

(86) PCT No.: PCT/IB2015/001106
§ 371 (c)(1),
(2) Date: Dec. 30, 2016

(87) PCT Pub. No.: WO2016/005805
PCT Pub. Date: Jan. 14, 2016

(65) Prior Publication Data
US 2017/0140637 A1 May 18, 2017

Related U.S. Application Data

(60) Provisional application No. 62/021,198, filed on Jul. 6, 2014.

(51) Int. Cl.
*G08B 1/08* (2006.01)
*G08B 25/01* (2006.01)
(Continued)

(52) U.S. Cl.
CPC .......... *G08B 25/016* (2013.01); *G08B 25/10* (2013.01); *H04W 4/02* (2013.01); *H04W 4/22* (2013.01)

(58) Field of Classification Search
CPC ....... G08B 25/016; G08B 25/10; H04W 4/22; H04W 4/02
See application file for complete search history.

(56) References Cited

U.S. PATENT DOCUMENTS 7,034,678 B2 4/2006 Burkley et al.
7,091,852 B2 8/2006 Mason et al.
(Continued)

FOREIGN PATENT DOCUMENTS

EP 0846440 A2 6/1998

*Primary Examiner* — Erin File
(74) *Attorney, Agent, or Firm* — Robert S. Alexander; Anna L. Kinney; Michael W. Ferrell

(57) ABSTRACT

A system for monitoring the safety of personnel on a work site, by providing workers on the site with portable battery powered safety monitors equipped with alarms, sensors to detect hazardous conditions, at least two forms of geolocation and two forms of voice and data telecommunication and two CPU's sharing the computation load, each CPU equipped to monitor and reset the other in case of failure to function, with each monitor capable of serving as a node in a mesh network and relaying information concerning alarms detected including location thereof to other monitors on the mesh network.

18 Claims, 20 Drawing Sheets

(51) Int. Cl.
*H04W 4/02* (2009.01)
*H04W 4/22* (2009.01)
*G08B 25/10* (2006.01)

(56) References Cited

U.S. PATENT DOCUMENTS

| | | |
|---|---|---|
| 8,149,112 B2 | 4/2012 | Schlager et al. |
| 8,294,568 B2* | 10/2012 | Barrett .............. H04M 3/42348 340/539.11 |
| 8,509,731 B2 | 8/2013 | Kholaif et al. |
| 8,688,375 B2 | 4/2014 | Funk et al. |
| 8,812,013 B2 | 8/2014 | Agarwal et al. |
| 9,319,212 B2* | 4/2016 | Feher .................. H04L 5/1453 |
| 2003/0062046 A1 | 4/2003 | Wiesmann et al. |
| 2004/0004547 A1 | 1/2004 | Appelt et al. |
| 2005/0114154 A1 | 5/2005 | Wolkowicz et al. |
| 2005/0136912 A1* | 6/2005 | Curatolo .............. G01S 5/0036 455/423 |
| 2006/0017560 A1 | 1/2006 | Albert |
| 2007/0032246 A1* | 2/2007 | Feher .................. H04W 64/00 455/456.1 |
| 2007/0222588 A1* | 9/2007 | Wolfe .................. G08B 13/1427 340/539.13 |
| 2008/0001735 A1* | 1/2008 | Tran .................... G06F 19/3418 340/539.22 |
| 2010/0317420 A1* | 12/2010 | Hoffberg ............. G06Q 30/0207 463/1 |
| 2011/0161885 A1 | 6/2011 | Gonia et al. |
| 2012/0127980 A1* | 5/2012 | Quinn .................. H04W 8/005 370/338 |
| 2014/0084165 A1* | 3/2014 | Fadell .................... G08B 17/00 250/340 |
| 2014/0085093 A1* | 3/2014 | Mittleman ............ H04L 12/282 340/628 |
| 2014/0183269 A1* | 7/2014 | Glaser .................... G06F 21/32 235/492 |
| 2015/0070181 A1* | 3/2015 | Fadell .................... G08B 19/00 340/628 |
| 2015/0096876 A1* | 4/2015 | Mittleman ............. H01H 11/00 200/341 |
| 2015/0097689 A1* | 4/2015 | Logue .................... G08B 25/10 340/632 |
| 2015/0100167 A1* | 4/2015 | Sloo ...................... H04L 67/025 700/278 |
| 2015/0172872 A1 | 6/2015 | Alsehly et al. |

* cited by examiner

BACK

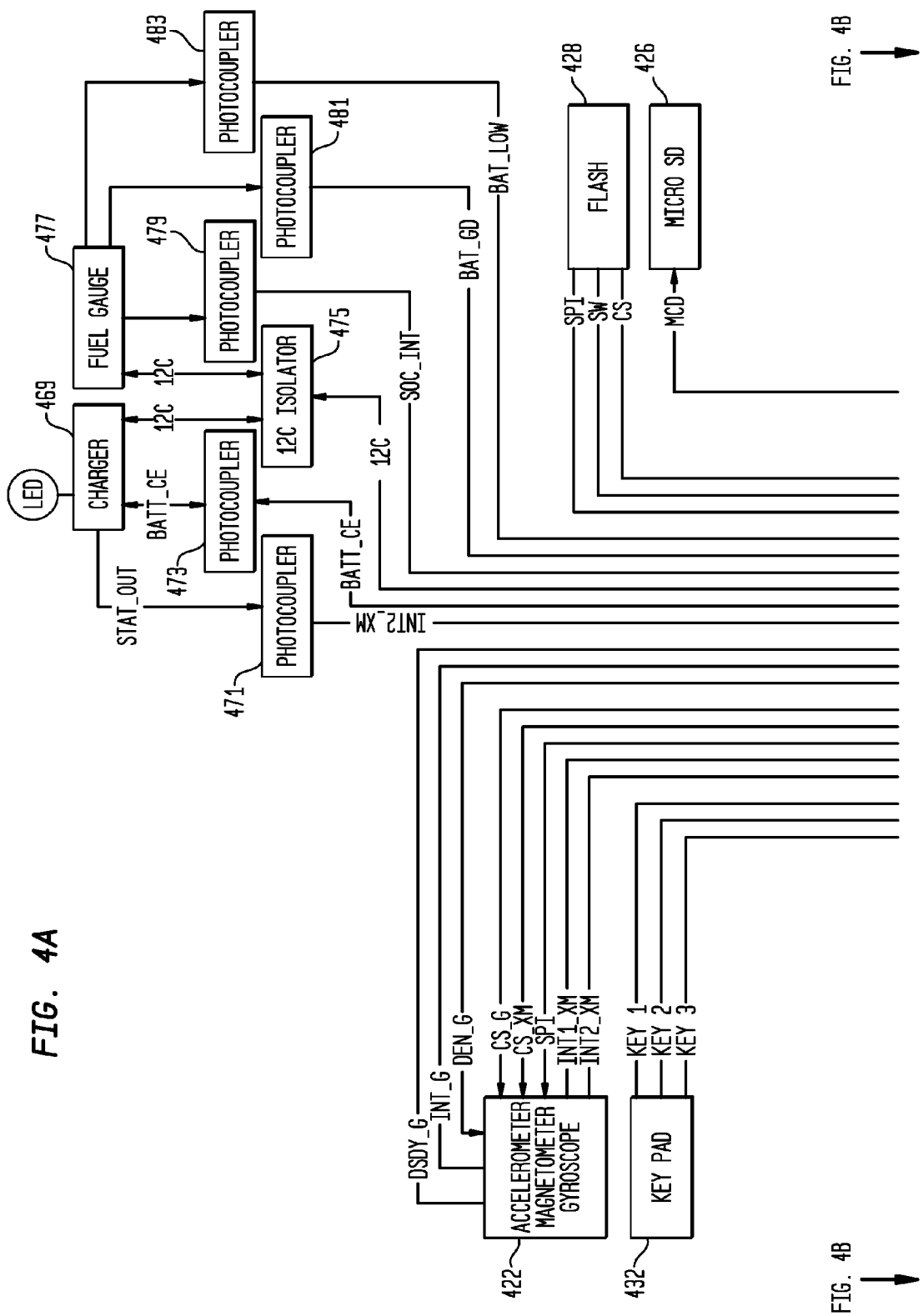

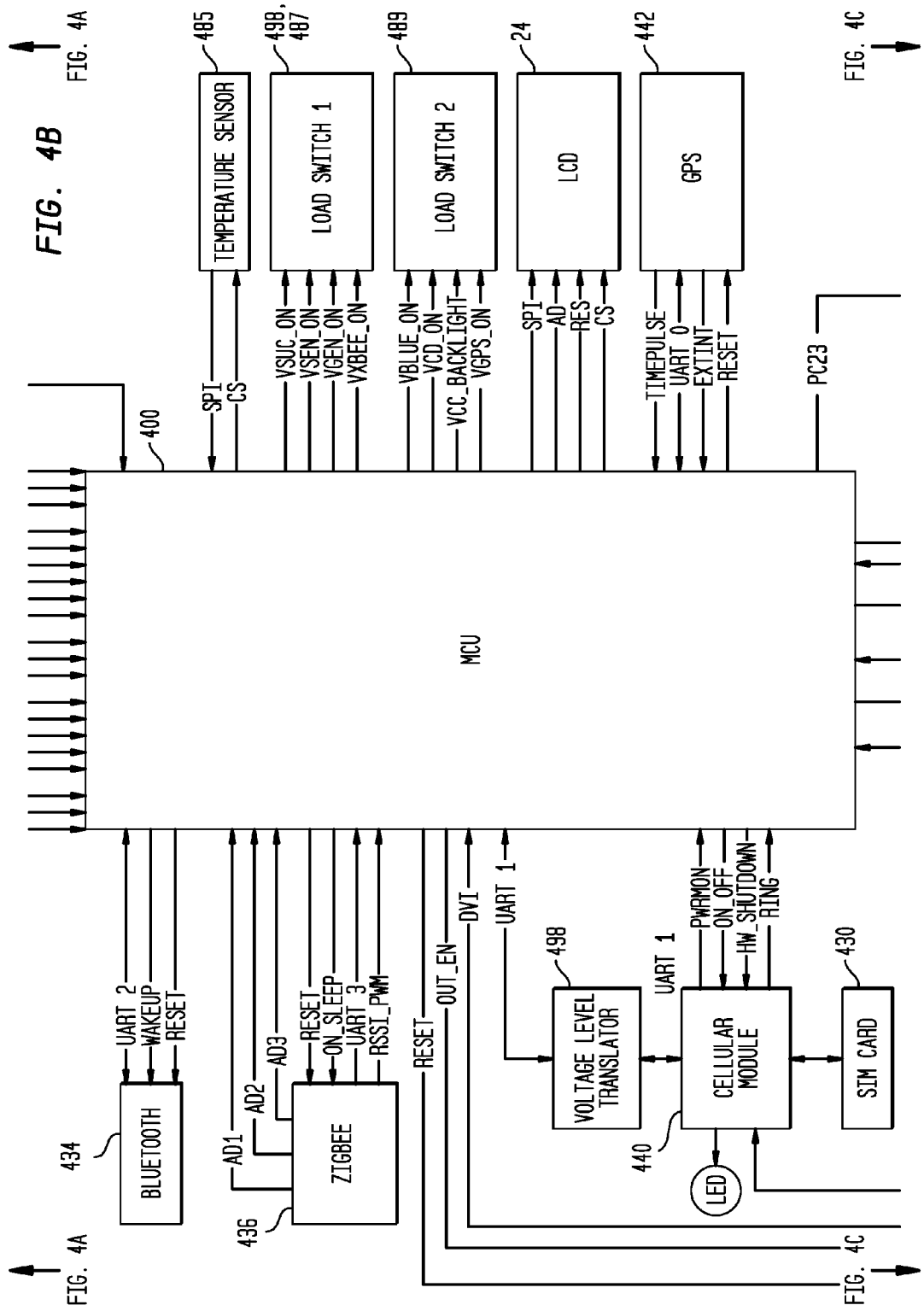

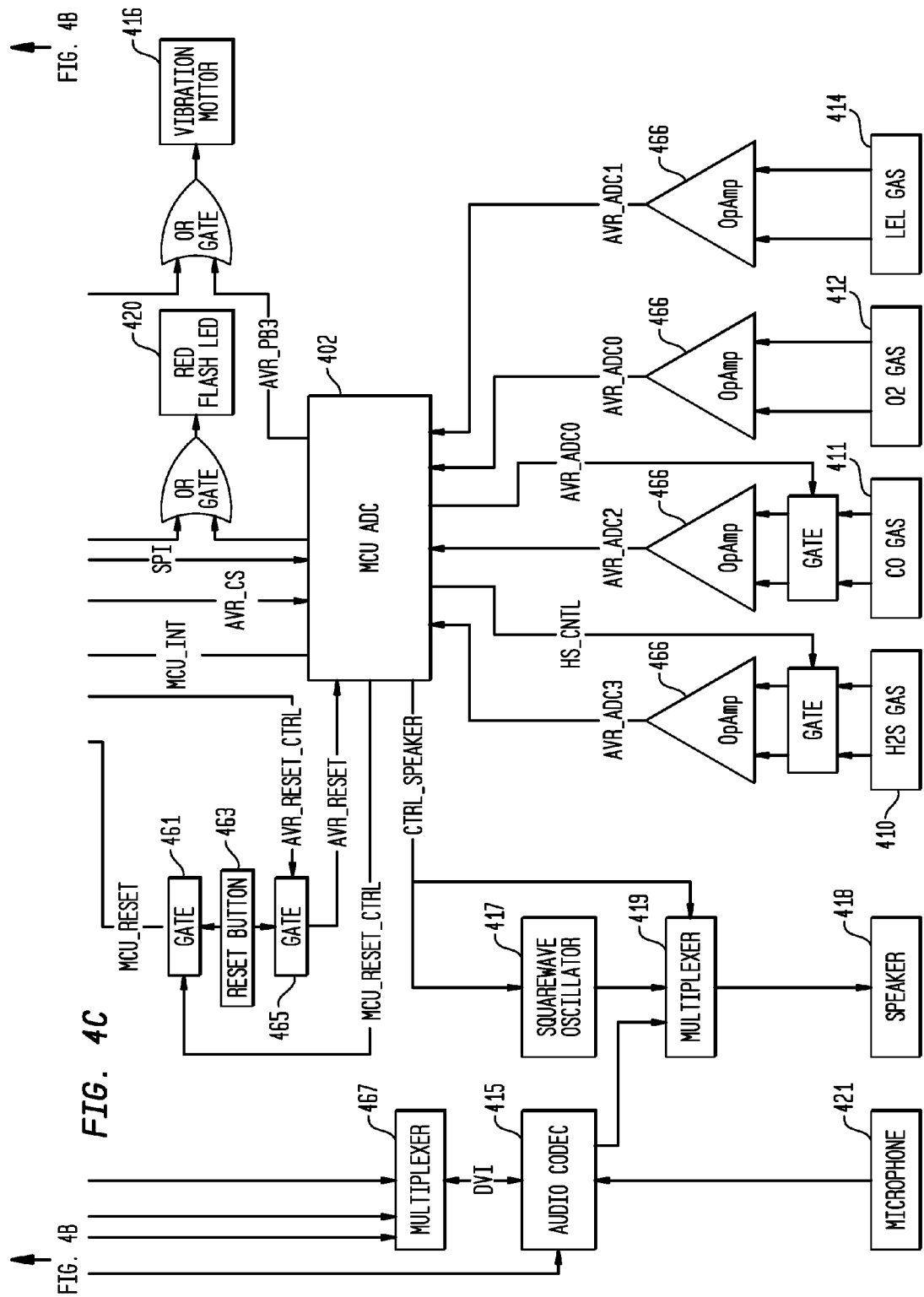

EMERGENCY CALL PROTOCOL

PERSONAL HAZARD DETECTION SYSTEM WITH REDUNDANT POSITION REGISTRATION AND COMMUNICATION

CLAIM FOR PRIORITY

This application is a national phase entry of International Application No. PCT/IB2015/001106, filed 2 Jul. 2015, entitled "Personal Hazard Detection System With Redundant Position Registration and Communication", which claims priority to U.S. Provisional Patent Application Ser. No. 62/021,198 of the same title, filed 6 Jul. 2014. The priorities of International Application No. PCT/IB2015/001106 (published as WO 2016/005805) and U.S. Provisional Patent Application No. 62/021,198 are hereby claimed and their disclosures hereby incorporated into this application by reference in their entirety.

OVERVIEW AND TECHNICAL FIELD

Work should not be life-threatening—yet, all too often, it is. In industrial settings, workers often must inherently deal with extreme temperatures, toxic and/or explosive atmospheres, lack of oxygen, heavy equipment moving at high speed, dangerous nips, falls, and even heart attacks. Even the best thought out safety procedures will fail as unexpected situations and conditions arise, equipment fails and workmen in a hurry, or who think they know better, by-pass protective measures, discard cumbersome, uncomfortable and/or confining safety gear or come up with procedures they feel are "improvements" over those demanded by management. Accordingly, in addition to well thought out preventive procedures intended to ensure that workers are not exposed to hazards, remedial, rescue, ameliorative and palliative procedures are needed as well to ensure that, when exposure to undesired circumstances does occur, prompt, decisive action can be taken to deal with the situation by first alerting those subject to the hazard, then bringing responders to the scene as quickly as possible while ensuring that those responders have adequate information to enable them to know where the hazard is being experienced and to come equipped with suitable gear to deal with the situation immediately upon arrival, rather than having to collect their own data after arrival to understand the situation, then retrieve the tools needed to safely address the situation. We address this need by providing an enterprise-wide, monitoring system comprising a highly redundant mesh network of autonomous, portable, position-aware, personal safety monitors detector/transceivers (hereinafter "APPAPS monitors") worn by individual workers communicating voice and data with a base station in multiplicity of ways including: direct telephony, cellular telephony, communication through a fixed or mobile remote network access point such as a ZigBee, a local wireless network access point incorporating IEEE 802.15.4 or cell tower possibly including a satellite capable mobile access point, relayed communication through other APPAPS monitor whether directly to the base station, through a cellular network, through a remote access point, or, most importantly, through any combination of these necessary to enable transmission from an alerting APPAPS to nearby APPAPS units and the base station. In our preferred embodiment, we implement ZigBee using XBee-PRO DigiMesh 2.4. In many cases it will be appropriate to allow ordinary cellular communication through the APPAS but restrict the numbers to which said calls can be made and/or provide a means of automatically disconnecting users and/or potential responders in the event that a user of an APPAPS unit is involved anything other than communication concerning an emergency situation when a hazard alert is sounded on the network. In some cases, it may prove appropriate to entirely prevent non-emergency calls on the APPAPS units. This monitoring system ensures that when an outside of parameters situation occurs, reports of the nature of the situation as well as its location are automatically provided to safety personnel and though out the enterprise despite numerous circumstances that can make either or both of communication and position determination difficult. In many cases, the access points will be electronically identical to the APPAPS monitors or nearly so, but possibly disposed in an enclosure better suited for stationary duty, fitted with a longer range antenna or more antennae and hard-wired into the mains (electric power service) with a suitable stand-alone transformer, sometimes referred to disparagingly as a wall wart, so that both hazards monitoring and signal relay capabilities are provided even in the absence of a user with the battery providing continued service even in the case of a power outage.

However, mere communication is not enough, it is equally critical that the most reliable locational data also be transmitted so that potential responders will know if they are positioned to be able to provide assistance, as well know where to direct their efforts if able to respond. Positional awareness is provided by several versions of position determination, including at least: trilateration (GPS); combined with at least one radio signal location capability chosen from the group consisting of: Received Signal Strength Indication (RSSI); time difference of arrival (TDOA); frequency difference of arrival (FDOA), signal transit time (time of flight) measurement between units, Wi-Fi-based positioning system (WPS); and angulation, particularly triangulation, to make the most of data available from neighboring APPAPS monitors. Use of multi-lateration, either standalone or as incorporated in GSM, bilateration; unilateration, multi-angulation, and time difference of arrival should be considered optional, but desirable. Also suitable are Frequency Difference On Arrival (FDOA); Up-Link Time Difference Of Arrival (U-TDOA); Enhanced Observed Time Difference (E-OTD) and similar geo-location technologies. In general, locations derived by use of several readings from several systems will be inconsistent so the best estimate is derived by prioritizing the methods, so that a determination presently determined by GPS outdoors would be accepted at face value unless it varied markedly from almost contemporaneous GPS determinations, whilst, if no GPS determination is available, position determination would be augmented by use of radio frequency signals from: fixed access points; as well as neighboring APPAPS units and mobile access points having suitably well-known positions; and, optionally, dead reckoning based on accelerometer and gyroscopic readings, with dead reckoning being used to augment the latest reading from GPS or radio based determinations in the absence of better data and disregarded entirely if GPS signals or signals from several APPAPS units or access points with known locations are available.

BACKGROUND

Wearable personal safety devices incorporating sensors and alarms, designed to alert the wearer to harmful or deadly environmental hazards have been around for over a decade. Yet wearers of these devices still die. Wearers have been found dead hours later, sometimes in pairs, with alarms still sounding, responding to hazardous environmental conditions. Personal safety devices incorporating communication to a central server or base station often fail to reliably protect their wearers. Human errors in monitoring and responding are sometimes the cause, along with alarm and response transmission delays caused by inconsistent signal strengths across the uneven yet extensive enterprise environments workers must traverse. In many cases, the hazard strikes so quickly, or insidiously, that it prevents the personal safety devices from protecting its wearer.

Numerous efforts have been made to address these issues yet, so far, the systems available have had major deficiencies in the areas noted above.

In Burkley et al., U.S. Pat. No. 7,034,678, First Responder Communications, a First Responder Communications System (FRCS), also referred to as an Automated Incident Control System, is provided that supports inter-agency and intra-agency communications among first responders including fire, police, border patrol, emergency medical service, safety, and/or other agencies. The FRCS also supports communication among multiple on-scene agencies and various command and control personnel and increases situational awareness by automatically providing position information as well as other sensor information. Components of the FRCS integrate multiple communications channels including High Frequency (HF), Very High Frequency (VHF), Ultra High Frequency (UHF)/microwave, cellular, satellite, and Public Switched Telephone Network (PSTN). The FRCS also provides position and time information via Global Positioning System (GPS) and/or other positioning systems, with a peer-to-peer self-configuring network, a control console providing current information relating to each responder radio and enabling the operator to view the location and activity of each first responder with a responder radio or field device; sensors can include: smoke (potential fire, danger); radiation (HAZMAT danger); moisture (environmental condition); biological agents (HAZMAT danger); flow meter (water flow in fire hoses, pumps, tunnels or similar areas subject to flooding); ambient temperature (potential fire, explosion, combustible area); responder body temperature (responder condition, physical problem, fear, danger); pressure (shockwave); proximity (movement, activity); responder pulse rate (responder vitals, physical condition, fear, danger); vibration/motion (senses vehicle movement, structure collapse); equipment status (vehicle condition); motion (vehicle movement, suspect movement); tachometer (vehicle condition); sound/frequency (gun shot, explosion, vehicle engine, movement); head position (field of vision, blind spot); gas/vapor (carbon monoxide); chemicals (HAZMAT danger); visibility/visible light level (environmental condition); camera (situational status, suspect tracking); frequency scanners (monitor suspect radio communications); light (environmental condition).

In Mason et al. U.S. Pat. No. 7,091,852, Emergency Response Personnel Automated Accountability System; an emergency response personnel automated accountability system, also referred to as a Firefighter Automated Accountability System (FAAS), is provided that supports automatic tracking of and limited communications among first responders including fire, police, emergency medical service, and safety personnel. The FAAS increases situational awareness and safety of first responder personnel by automatically providing position information as well as other sensor information. Components of the FAAS integrate wireless mesh networks with positioning and communication systems to support real-time tracking of and communications with emergency response personnel. The FAAS incident awareness system provides position and time information via Global Positioning System (GPS) and/or other positioning systems, and processed data from sensors to provide enhanced communications, command and control capabilities to the first responders and incident command at the incident scene.

In Schlager et al.; U.S. Pat. No. 8,149,112 B2, Multi-Hazard Alarm System Using Selectable Power-Level Transmission and Localization, a personal alarm system includes a monitoring base station and one or more remote sensing units in two-way radio communication. An electronic handshake between the base station and each remote unit is used to assure system reliability. The remote units transmit at selectable power levels. In the absence of an emergency, a remote unit transmits at a power conserving low power level. Received field strength is measured to determine whether a remote unit has moved beyond a predetermined distance from the base station. If the distance is exceeded, the remote unit transmits at a higher power level. The remote unit includes sensors for common hazards including water emersion, smoke, excessive heat, excessive carbon monoxide concentration, and electrical shock. The base station periodically polls the remote units and displays the status of the environmental sensors. The system is useful in child monitoring, for use with invalids, and with employees involved in activities which expose them to environmental risk. Alternative embodiments include a panic button on the remote unit for summoning help, and an audible beacon on the remote unit which can be activated from the base station and useful for locating strayed children. In another embodiment, the remote unit includes a Global Positioning System receiver providing location information for display by the base station.

In Kholaif et al., U.S. Pat. No. 8,509,731, Location Determination For Mobile Devices In Emergency Situations, an emergency locator component for a mobile communication device enables the mobile communication device to obtain location information from other neighboring mobile devices in the event that the mobile communication device is unable to determine its own location. The mobile communication device employs a short-range radiofrequency transceiver to broadcast a request for location information to the neighboring mobile devices. A response containing location information may be received from another mobile device equipped with a similar emergency locator component. Accordingly, this technology enables mobile devices to exchange location information by setting up an ad-hoc network. The location information can be included, for example, in an emergency phone call to an emergency services call center.

In Funk et al., U.S. Pat. No. 8,688,375, Method And System For Locating And Monitoring First Responders, methods and systems are provided for locating and monitoring the status of people and moveable assets, such as first responders, including firefighters and other public service personnel, and their equipment both indoors and out to provide for locating and monitoring the status of people and assets in environments where GPS systems do not operate, or where operation is impaired or otherwise limited. The system and method uses inertial navigation to determine the location, motion and orientation of the personnel or assets and communicates with an external monitoring station to receive requests for location, motion orientation and status information and to transmit the location, motion orientation and status information to the monitoring station. The system and method can include storing the location, motion and orientation data as well as status data, in the event that the communication system is unable to communicate with and transmit information to the monitoring station, the system will wait until communication is restored and transmit the status information to the monitoring station to update the location, motion orientation and status information for the person or asset.

In Alsehly et al., Method of Estimating Position of a Device, US Patent Application Publication: 2015/0172872, the location of device is estimated by providing a database of location specific geographical descriptive data; obtaining location data relating to the position of the device; retrieving geographical descriptive data specific to an indoor region from the said database, the indoor region being selected dependent on the location data; and subsequently estimating the position of the device taking into account the retrieved data. The method can be used with existing or new positioning systems to improve the execution of the said positioning systems, particularly when the positioning system is being used indoors In Agarwal et al., U.S. Pat. No. 8,812,013, Peer and Composite Localization For Mobile Applications, A system and method for peer based localization system using radio technology, such as Bluetooth or Wi-Fi ad-hoc technology that enables mobile devices such as cell phones, smart phones, laptops, handheld communication devices, handheld computing devices, satellite radios, global positioning systems, PDAs, etc. to discover their physical location relative to one another. In addition, the peer based localization can use a plurality of radio technologies to increase the accuracy of the physical location estimates. Additionally or alternatively, the peer based localization technique can be combined with infrastructure based location techniques, such as triangulation, GPS, or infrastructure based Wi-Fi localization in order to transpose virtual coordinates into physical coordinates.

In Gonia et al., United States Patent Application Publication 2011/0161885, a wireless location-based gas detection system and method includes a gas detector for wirelessly detecting location information associated with a hazardous gas event. The gas detector includes one or more remote gas sensors that monitor for the occurrence of a gas event and wirelessly communicates information with respect to the location of the event in association with time information to a server or location manager. A wireless communication device in association with one or more location anchor points periodically and under event conditions, transmits the location information and the gas concentration level. A location engine calculates an estimated location of the gas detector based on information received from the wireless communication device and provides the location data to the location manager. The location manager records the gas concentration level, the estimated location, and the time information and stores this information within a database. A graphical user interface is provided for visualizing the current and historical information.

SUMMARY OF THE INVENTION

An enterprise safety network comprising a server, at least one wireless access point and a mesh network of interconnected wearable safety monitoring devices; each autonomously capable of determining its position directly through GPS, derived either directly from satellite or via mobile telephony, dead reckoning; calculated by RSSI, TDOA or via signal transit time from known positions of other safety monitoring devices in the network or by a combination of the foregoing depending upon the available geo-location information. Each device constantly monitors both its own location and its own sensors and therefore is capable of alerting other safety monitoring devices in the network about its position and the precise details of the hazardous environmental threshold breach or other health threat, should its wearer fail to acknowledge and countermand a local alarm in a timely fashion. It is an important aspect of one embodiment of this invention that once the APPAPS monitor detects a hazard situation, it automatically transmits a warning signal and, until countermanded by the user, continues to sound an audible alarm accompanied by unit vibration and flashing light and continues these local warning signals until countermanded which shuts off only the audible alarm and unit vibration. Even if the local alarm is countermanded, the APPAPS unit will periodically transmit an alarm to a central base station, as well as APPAPS units in communication with the APPAPS unit indicating the hazard, so long as that hazard is registered upon the APPAPS unit's sensors. Once an alarm is sounded, other safety monitoring devices in the network will display local sensor values and also the remote alarmed device's levels of the environmental hazard, automatically determining an estimate of the distance and direction to the wearer of the remote alarmed device. The closest co-workers in the vicinity are then prepared for the environmental hazard levels, enabling them to organize a coordinated and safe retrieval of the distressed, and potentially incapacitated, workers. Significantly, when alerted to the presence of a hazard at a second APPAPS monitor, each APPAPS monitor, will additionally query its user (the user of the APPAPS monitor receiving a hazard alarm from another APPAPS unit) as to whether it will be responding to the APPAPS monitor experiencing the hazard situation and will forward the user's response not only to the APPAPS monitor experiencing the hazard situation but also to all other APPAPS monitor that it is communicating with, as well as to the centralized safety server, whether directly via conventional cellular telephony or via the mesh network, thus enabling the other users and the central safety team to determine how to respond to the hazard situation.

More particularly, the invention relates to a system for monitoring the safety of personnel on an enterprise site, comprising: a network enabled central safety server capable of communicating wirelessly with devices on the enterprise site, the plurality of autonomous, portable, position-aware, personal safety monitors ("APPAPS monitors"); each APPAPS monitor having:
  i) a programmable microprocessor module, including: (a) a data input and output bus, (b) data storage, (c) program instruction storage, (d) an alarm module capable of being countermanded by the user via a human interface; (e) a communications module; (f) a geo-location module, and (g) a networking module capable of communicating as a node in a wireless mesh network;
  ii) a radio frequency transceiver coupled to said programmable microprocessor module;
  iii) an antenna operatively connected to said radio frequency transceiver; iv) an array of sensors coupled to said data bus;
  v) said communications module being capable of wireless data, telephony and short message communication with at least a mesh network of functionally similar APPAPS monitors and the central safety network;
  vi) a user interface module capable of providing sensibly perceptible signals from said microprocessor to the user, as well as inputting signals from the user to the microprocessor;
  and vii) an array of sensors operatively connected to the data input bus of said programmable microprocessor module;

said geo-location module including at least GPS capability, an accelerometer, a gyroscopic sensor for detection of angular velocity and, and either an RSSI module, transit time measurement module or preferably both and being capable of estimating the position of the device at least: (a) directly via said GPS capability, either by direct satellite observation or by GPS enabled cellular telephony; and (b) as derived from transit time measurements and/or the received signal strength indicated ("RSSI") from signals of other functionally similar APPAPS monitors and/or wireless local area network access points with known positions in mesh network connected communication therewith and, if necessary, known motion of the APPAPS monitor from previously known locations as determined by the accelerometer, transit time and/or RSSI computations;

when a local alarm condition is indicated at one of said APPAPS monitors, said alarm module of said one of said APPAPS monitors being capable of: (1) alerting the user directly through the user interface via a sensibly perceptible signal of the local alarm condition detected by its sensors; (2) automatically and reiteratively, transmitting data concerning at least the alarm condition, geo-location and sensor data to other APPAPS monitors connected to said mesh network for so long as its sensor indicate a local hazard condition; and when a remote alarm condition is reported by another APPAPS monitor connected to said mesh network, said alarm module of said one APPAPS monitor being capable of: (1) alerting the user of said one APPAPS monitor directly through the user interface via a sensibly perceptible signal of the remote alarm condition reported by said other APPAPS monitor connected to said mesh network; (2) advising APPAPS monitors in communication therewith whether its user will be responding to the remote alarm condition; and (3) responding to said other APPAPS monitor's alarm condition by activating its user interface to indicate data relating to an estimated position of said other alarmed APPAPS monitor; and sensor data communicated by said other alarmed APPAPS monitor and acknowledging receipt of the alarm condition transmission, automatically and reiteratively communicating with additional mesh network connected APPAPS monitors on said mesh network until a predetermined number of the additional mesh network connected APPAPS monitors have responded to the alarm condition.

In a more preferred embodiment, the invention relates to a system for monitoring the safety of personnel on an enterprise site, comprising: a plurality of autonomous, portable, position-aware, personal safety monitors ("APPAPS monitors"), said APPAPS monitors having the capability to establish a mesh network, a network enabled central safety server capable of communicating wirelessly with APPAPS monitors on the enterprise site through a multiplicity of remote wireless network access points, a mesh network established by said APPAPS monitors, and through cellular telephony; each APPAPS monitor including:

i) a first programmable microprocessor module, including at least: (a) a geo-location module, (b) a data input and output bus, (c) data storage, (d) program instruction storage; and (e) a communications module; (f) a networking module capable of communicating as a node in said wireless mesh network; and (g) an array of sensors coupled to said data bus;

ii) a second programmable microprocessor module including at least: (a) a watch dog module capable of monitoring said first microprocessor module and resetting it in case of impairments of microprocessor stability or correct functioning including those due to voltage drops, time outs, anomalies, long ramp-up times, programs stuck in endless loops, buffer overflows, memory leaks, and similar well-known misbehavior of logic circuits; (b) a data input and output bus, (c) data storage, (d) program instruction storage; and (e) a communications module;

iii) a radio frequency transceiver coupled to one of said programmable microprocessor modules;

iv) an antenna operatively connected to said radio frequency transceiver;

v) a user interface module capable of providing sensibly perceptible signals from said microprocessors to the user, as well as inputting signals from the user to at least one of said microprocessors; and vi) an array of sensors operatively connected to the data input bus of said second programmable microprocessor module (vii) an alarm module microprocessor module capable of communicating with at least said second programmable microprocessor module and capable of initiating sensor output indicative of a hazard situation said sensor output indicative of a hazard situation capable of being countermanded by the user via said user interface and;

said communications module being capable of cellular, wireless data, at least half duplex telephony and short message communication with at least a mesh network of functionally similar APPAPS monitors, remote wireless network access points and the central safety network;

said geo-location module including at least GPS capability, an accelerometer, gyroscopic sensor for detection of angular velocity and, and either an RSSI module, a time measurement module or preferably both and being capable of estimating the position of the device at least; (a) directly via said GPS capability, either by direct satellite observation or by GPS enabled cellular telephony; and (b) as derived from time measurements and/or the received signal strength indicated ("RSSI") from:

signals of other functionally similar APPAPS monitors with known positions in mesh network connected communication therewith;

signals from cellular access points;

signals for remote network access ports having known locations using at least one of transit time and/or RSSI computations; and at least when signals from devices with known locations are lacking, calculated motion of the APPAPS monitor from previously known locations as determined by the accelerometer and gyroscope;

when a local alarm condition is indicated at one of said APPAPS monitors, said alarm module of said one of said APPAPS monitors being capable of:

(1) alerting the user directly through the user interface via a sensibly perceptible signal of the local alarm condition detected by its sensors;

(2) automatically and reiteratively transmitting data concerning at least the alarm condition, geo-location and sensor data to other APPAPS monitors connected to said mesh network unless and until said hazard condition has been abated and the hazard condition countermanded via the human interface of said one APPAPS monitor; and when a remote alarm condition is reported by another APPAPS monitor connected to said mesh network, said alarm module of said one APPAPS monitor being capable of:
(1) alerting the user of said one APPAPS monitor directly through the user interface via a sensibly perceptible signal of the remote alarm condition reported by said other APPAPS monitor connected to said mesh network;
(2) forwarding the alarm to:
APPAPS monitors in communication therewith;
remote network access points connected to said central safety server; and
said central safety server;
(3) transmitting an indication of whether it's user will be responding to the remote alarm condition; and
(4) responding to said other APPAPS monitor's alarm condition by activating its user interface to indicate data relating to an estimated position of said other alarmed APPAPS monitor; and sensor data communicated by said other alarmed APPAPS monitor and acknowledging receipt of the alarm condition transmission, automatically and reiteratively communicating with additional mesh network connected APPAPS monitors on said mesh network until a predetermined number of the additional mesh network connected APPAPS monitors have responded to the alarm condition.

Still more particularly, this invention relates to: a system for monitoring the safety of personnel on an enterprise site, comprising:

a central monitoring server connected to at least a local network and capable of wireless communication with APPAPS monitors through at least one wireless access point and cellular telephony, a plurality of autonomous, portable, position-aware, personal safety monitors (APPAPS monitors);
each APPAPS monitor having:
i) a programmable microprocessor module, including:
(a) a data input and output bus, (b) data storage, (c) program instruction storage, (d) an alarm module capable being countermanded by the user; (e) a communications module; (f) a geo-location module, and (g) a networking module capable of communicating as a node in a wireless mesh network;
ii) a radio frequency transceiver coupled to said programmable microprocessor module;
iii) an antenna operatively connected to said radio frequency transceiver;
iv) said communications module including mobile telephony connectivity, operatively connected to said radio frequency transceiver, said communications module comprising a data packet formatting, caching and forwarding system, said communications module being capable of communication both: (i) directly through the device's own mobile telephony connectivity; and (ii) indirectly via at least one of any of the other functionally similar APPAPS monitors having available connectivity; with at least:
(a) a mesh network of functionally similar APPAPS monitors;
(b) a mobile telephony network; and
(c) at least a local network through wireless access points,
v) a user interface module capable of providing sensibly perceptible signals from said microprocessor to the user, as well as inputting signals from the user to the microprocessor; and
vi) an array of sensors operatively connected to the data input bus of said programmable microprocessor module;

said geo-location module being capable of storing data concerning the history of the estimated position of said APPAPS monitor, along with applied certainty factors therefor, said geo-location module including GPS connectivity, an accelerometer, a gyroscope, radio source location module chosen from the group consisting of:
a transit time computation module capable of computing the transit time of signals to and from other APPAPS monitors and remote wireless access points in communication therewith and thereby determining relative position,
a Received Signal Strength Indicator module (RSSI); and
a Time Difference of Arrival module said geo-location module being capable of estimating the position of the device; (a) directly via said GPS connectivity; (b) via the device's own mobile telephony providing assisted GPS capability, (c) derived by the radio source location module based on communication with other functionally similar APPAPS monitors with known positions in mesh network connected communication therewith, and (d) known motion of the APPAPS monitor as determined by the accelerometer, gyroscope and RSSI computations; and (e) derived from interacting with network connected devices with known positions;

when a local alarm condition is indicated at one of said APPAPS monitors, said alarm module of said one of said APPAPS monitors, being capable of: (1) alerting the user directly through the user interface via a sensibly perceptible signal of a local alarm condition detected by its sensors; (2) reiteratively refining its estimated position; and (3) for so long as its sensor indicate a hazard, automatically and reiteratively, transmitting at least one formatted data packet containing at least the alarm condition, geo-location and sensor data to: (a) other APPAPS monitors connected to said mesh network and initiating interaction between the alarmed APPAPS monitor and at least one other APPAPS monitor connected to said mesh network; and (b) a central monitoring server via the communications module and said at least one wireless access point for said local network;

said alarm module of said one APPAPS monitor, when a remote alarm condition is reported by another APPAPS monitor connected to said mesh network, being capable of: (1) alerting the user of said one APPAPS monitor directly through the user interface of said one APPAPS monitor via a sensibly perceptible signal of the remote alarm condition reported by said other APPAPS monitor (the alarmed monitor—the monitor whose sensors are indicating a local hazard) connected to said mesh network; (2) responding to said other APPAPS monitor's alarm condition by activating its user interface to indicate: data relating to an estimated position of said other alarmed APPAPS monitor; and sensor data communicated by said other alarmed APPAPS monitor and acknowledging receipt of the alarm condition transmission; (3) automatically and reiteratively communicating with additional mesh network connected APPAPS monitors on said mesh network and a central monitoring server on said local network; and calculating a ranked priority, based at least in part on distance from said other alarmed APPAPS monitor's position to each additional remote APPAPS monitor's position, said ranked priority capable of being communicated to the additional mesh network connected APPAPS monitors until a predetermined number of the additional mesh network connected APPAPS monitors have responded to the alarm condition, providing an updated indicator of not only whether they will be able to provide assistance but also whether they are experiencing safety issues as well; and (4) after a predetermined number of additional APPAPS monitors having a higher ranked priority have responded to the remote alarm condition from said one alarmed APPAPS monitor, discontinuing further communication concerning the remote alarm status with additional mesh network connected APPAPS monitors not reporting a local alarm, if each said additional APPAPS monitor is either: (a) excused from responding; or (b) not responding.

In more preferred embodiments of the present invention, each APPAPS monitor will have redundant microprocessors incorporated therein to ensure that continuous monitoring, geo-location and communication is conducted, even in the event of the failure of one microprocessor. Additionally, each APPAPS unit will desirably have "last gasp capability" enabling it to alert its user in the event of a major failure preventing it from conducting its essential functions of monitoring for hazards, geo-location and communication with other APPAPS monitors and/or a central safety server on said local network via a wireless access point.

In the most preferred embodiments of the present invention, each APPAPS monitor will have at least two microprocessors incorporated therein, with one handling data from sensors other than the accelerometer and gyroscope and serving in a watch dog capacity to reset said other processor in the event of low voltage, excessively long ramp up time, infinite loop; freeze, memory leakage or other malfunction to ensure that monitoring, geo-location and communication is conducted. In many cases it will be expedient to task the watch dog processor with handling the environmental sensors so that the watched processor can handle the heavy computation tasks of continuously updating geo-location which normally requires a significant portion of the processing capacity of a microprocessor which is not only small enough to be included in a cell-phone or pocket sized device but also has sufficiently low power draw to endure at least an eight hour, preferably twelve hour, shift on a battery of reasonable size.

BRIEF DESCRIPTION OF THE DRAWINGS

FIGS. 4A-4C are schematic diagrams illustrating the internal connectivity within an APPAPS monitor;

DETAILED DESCRIPTION OF PREFERRED EMBODIMENTS

Figure 1:
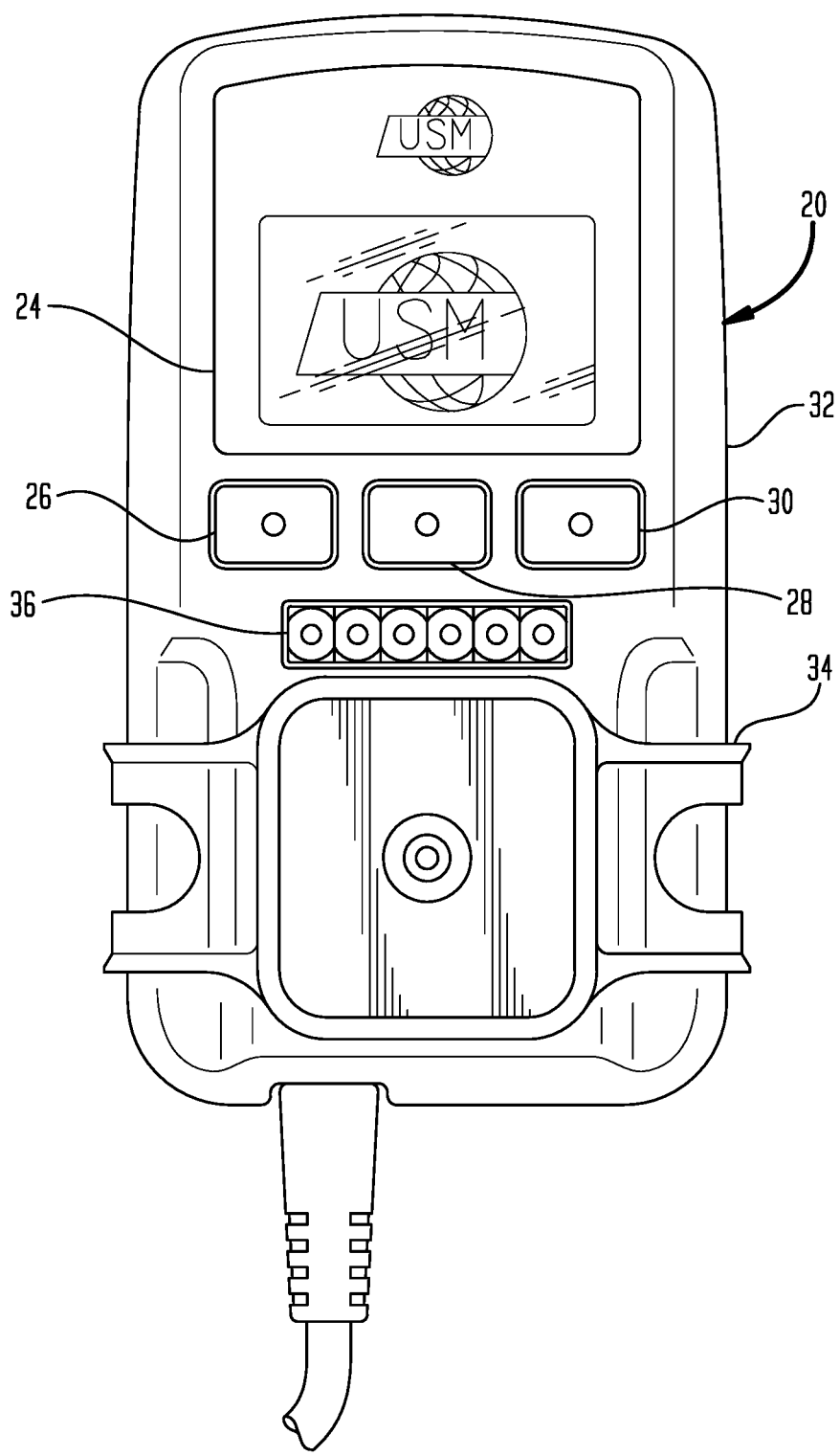
FIG. 1 is a schematic illustration of the outside appearance of an APPAPS monitor the present invention with a calibration fixture in place.

The personal hazard detection system of the present invention includes a central safety monitor server connected at least to the safety network and a plurality of autonomous, portable, position-aware, personal safety monitors detector/ transceivers (hereinafter "APPAPS monitors") worn by individual workers, wherein the APPAPS monitors are each capable of not only serving as a node in a mesh network, but also of connecting to the Internet via mobile telephony, as well as through wireless network access points, whether directly or indirectly using another APPAPS monitor in the mesh network. Each APPAPS monitor frequently updates its estimated geo-location using radio range detection and/or angulation estimates based upon known location of other APPAPS monitors in communication therewith, as well as by GPS either directly or indirectly through another APPAPS monitor having a suitable GPS signal or by telephony based upon known locations of cellular towers in communication with either the APPAPS monitor or another APPAPS monitor in communication therewith on the mesh network or direction finding and ranging using RSSI or predictive bilateration based upon calculation of signal transit time for a return signal from a wireless network access point having a known location or from another APPAPS monitor (subtracting time required for internal procedures in the APPAPS monitors) to supplement other geo-location techniques either refining their estimates or wholly supplanting them entirely when communication with other APPAPS monitors and/or GPS is not adequate.

Frequent updating of geo-location and positive default transmission of hazard indication along with geo-location information can be of vital importance in providing safety assistance to workers who have encountered a hazardous situation and may not be able report it before becoming incapacitated thereby. In such situations, even extra minutes required for locating the workers subjected to the hazard situation can be fatal. Further, by ensuring that others coming to render assistance are informed about the nature of the hazard encountered prior to arriving on the scene of the hazard exposure can be extremely important in protecting those coming to render assistance as well as in ensuring that when they do arrive they are equipped to deal with the situation without sending away for needed equipment only after discovering the need therefor upon arrival at the hazard scene.

The APPAPS monitor is a device about the size and shape of a large pocket calculator or cell phone but considerably thicker. It is intended to be worn continuously by all workers having any possibility of being exposed to a hazardous situation during the workday. Having large numbers of APPAPS monitors deployed across a job-site greatly eases communication since each APPAPS monitor has the potential to communicate with every other APPAPS monitor in range directly through the mesh network, indirectly through the mesh network for those out of range, using the wireless network access points, through telephony or a combination of the these, thereby ensuring that the chances of quickly reaching the central safety monitoring system and potential rescuers are enhanced when a hazard situation is detected. This not only greatly increases the number of potential saviors to address the hazard situation when it arise but also makes it possible for them to arrive quickly and well prepared. It also greatly increases the likelihood that the alarm message will reach those having the capacity, training, equipment or authority, to render effective aid. Preferred embodiments of APPAPS monitor will have the capacity to connect wirelessly to a vital signs sub-monitor having a body contact pad to monitor at least one vital sign such as heartbeat but also preferably respiration and body temperature. Unfortunately, in today's world, it will be prudent in many cases also monitor the bloodstream for drugs and alcohol, along with blood oxygen, blood pressure, fatigue and sufficient hydration. In many cases, to prevent circumvention of the system, the central safety network will interface with time reporting/pay roll and human resources to require use of the system throughout the day by workers who may wish to resist the level of monitoring provided by the APPAPS monitors.

FIG. 1 depicts an APPAPS monitor 20 with a visual display 24, input buttons 26, 28, and 30 arrayed below visual display 24 on the front surface of case 32. APPAPS monitor 20 is displayed with a calibration device 34 attached to vent 36 there behind. Case 32 also has an opening for microphone 36 on its front surface, as well as speaker 40 (FIG. 3) in any convenient location. Importantly both voice and short text communication capability is built into APPAPS monitor 20. Calibration device 34 makes it possible to pass a stream of gas having a known composition over the sensors to enhance the accuracy of measurements made by APPAPS monitor 20.

Figure 2:
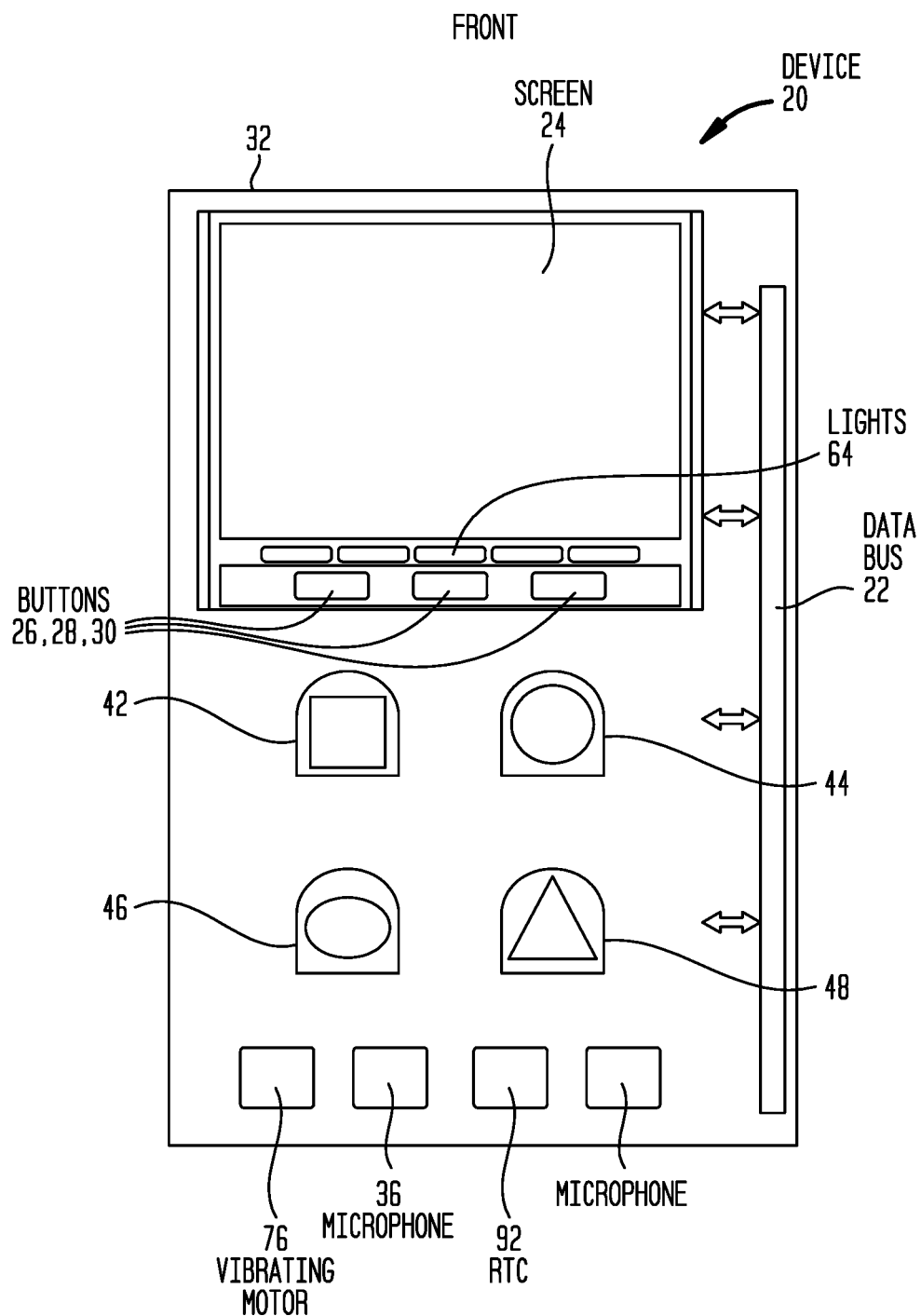
FIGS. 2 and 3 illustrate the various components incorporated into an APPAPS monitor of the present invention schematically without indicating position or relative size, but merely presence and functional interconnection.
Figure 3:
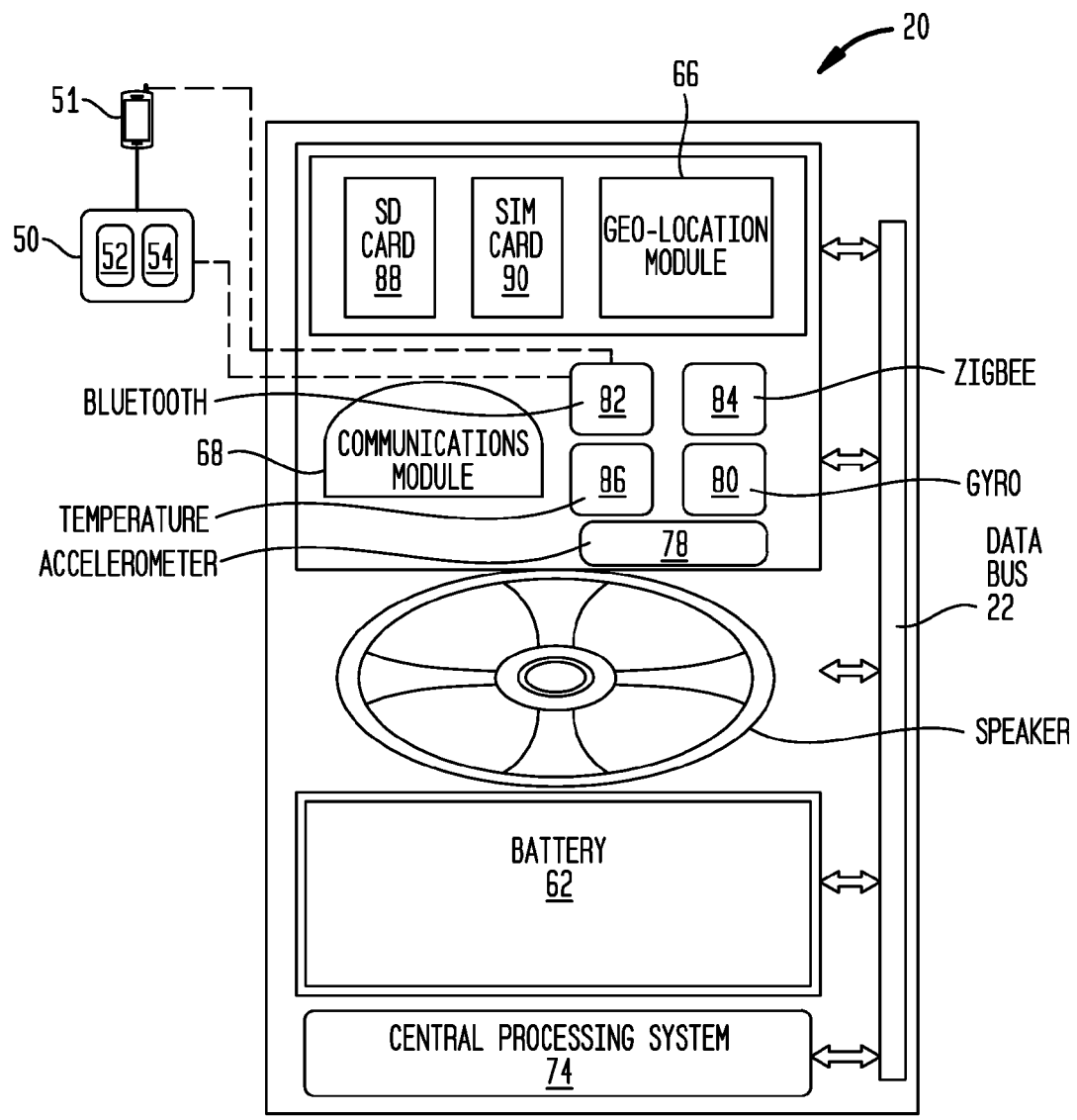

In FIGS. 2 and 3, the modules within case 32 include sensors 42, 44, 46 and 48 for detection of carbon monoxide, hydrogen disulfide, volatile hydrocarbons and oxygen, respectively. Depending on the industry in which these are employed, it may be prudent to add other sensors in anticipation of the hazards expected. In many cases, it will be important to monitor the APPAPS user's vital signs by attaching a pad providing a signal indicative of key safety indicators like heartbeat, respiration rate, skin temperature and the like. While cabled pads may be adequate in some cases, it is greatly preferred that the pads communicate wirelessly with the APPAPS unit using any of the known technologies such as BlueTooth, WiFi; ZigBee, and any other convenient method. In our most preferred embodiment, the vital signs are transmitted to the APPAPS monitor wirelessly through BlueTooth port 82 which receive signals from vital signs transmitter 51 hardwired to monitor pad 50 bearing thereupon skin temperature sensor 52 and heartbeat monitor 54. In many cases, monitoring for: CO, $H_2S$, lower explosive limit of volatile hydrocarbons, heart-rate, temperature, and force (via an accelerometer) will cover the most commonly encountered industrial hazards. Addition of capability of monitoring for oxygen will also be frequently desirable. As may be required by the enterprise, it may be prudent to monitor any of the following: ammonia, arsine, carbon dioxide, carbon monoxide, chlorine, chlorine dioxide, combustible gases, diborane, ethylene oxide, exhaust gases, fluorine, General Air Quality, hydrazine, hydrides, hydrogen, hydrogen chloride, hydrogen cyanide, hydrogen fluoride, hydrogen selenide, hydrogen sulphide, mercaptan, methane, nitric oxide, nitrogen dioxide, $NO_x$, oxygen, ozone, phosgene, phosphine, silane, sulphur dioxide, (tetrahydrothiophene, ionizing radiation sensing, light sensing, barometric sensing, lightning sensing, decibel sensing, blood sugar, blood pressure, blood oxygen, blood alcohol, drugs, dehydration sensing, core temperature and pedometric movement.

As noted in FIG. 3, battery 62 is sized to be capable of powering the APPAPS monitor 20 for at least an 8-12 hour shift. When battery 62 becomes substantially depleted, light 64 below visual display 24 is activated indicating that the battery should be recharged or replaced and a battery depleted signal is transmitted to the central safety network server to indicate that battery replacement and/or recharging is called for thereby enabling the central safety team to ensure that that this matter is attended to expeditiously. In some applications, redundant batteries may be used to considerable advantage but in petroleum processing facilities, applicable safety standards may militate against or entirely prevent use of redundant battery systems, so far more attention must be paid to monitoring the state of charge thereof. APPAPS monitor 20 has circuit modules 66 for geo-location, 68 for tele-communication, central processing system 74 controlling operation of APPAPS monitor 20, vibrating motor 76 (See FIG. 4C) for transmitting tactile signals to the user, as well as accelerometer 78, gyroscope 80, Bluetooth module 82, mesh network protocol implementation access point module 84, and temperature translation module 86. Additionally, card slots 88 for an SD card and 90 for a SIM card are provided subject to the understanding that as technology advances, SIM card slot 90 and SD card slot 88 will be supplanted by succeeding generations of technology for data input and output and data storage, respectively. Clock 92 provides functionality for determining transit time of signals between two APPAPS monitors 20 to determine their distance from each other. And of course, importantly, all the foregoing components interact with each other via data bus 22.

A suitable accelerometer with a 3D digital linear acceleration sensor, a 3D digital angular rate sensor, and a 3D digital magnetic sensor is currently offered under the model number LSM9DS0 iNEMO by STMicroelectronics N.V at 39, Chemin du Champ des FillesPlan-Les-Ouates, Geneva, Switzerland CH1228; Phone: 41 22 929 29 29 with a website at: http://www.st.com/web/en/home.html. Suitable Gas sensors are offered under the trade names MicroPEL and MicroCEL by City Technology Ltd, Walton Road, Portsmouth, Hampshire PO6 1SZ; United Kingdom; Tel: +44 (0) 23 9228 8100. It should be understood that all components mentioned herein are merely those we consider most suitable at the present time and, like all components incorporating substantial technology, new and improved versions appear with breathtaking speed.

FIGS. 4A-4C illustrate interrelationship between the various modules and MCU 400 with microcontroller MCUADC unit 402 providing the interface to digitize analog outputs of sensors 410, 411, 412, 414 so as take some of the load off of MCU 400 so that it can handle: cellular module 440 along with its associated GPS module 442, microphone 421, telephony multiplexer 467, accelerometer/magnetometer/gyroscope unit 422 as well as converting digital signals from CPU 400 to control audio codec 415, whilst MCU ADC 402 also handles vibration motor 416, square wave oscillator 417, multiplexer 419, speaker 418 and LED 420. Battery module 62 (FIG. 3), charged by charger circuit 469, powers MCU 400. All communication between the high voltage circuits and MCU 400 passes through photocouplers 471, 473 as well as I²C isolator 475 to isolate MCU 400 from high voltages whilst GPS module 442, Bluetooth module 434, mesh network protocol implementation access point module 436, audio codec 438 and are capable of direct interaction with CPU 400 as are display 24, SD card module 426, memory card module 428, SIM card module 430 and keypad 432. Photocouplers 479, 481 and 483 in conjunction with I²C isolator 475 similarly isolate Fuel Gauge 477 from MCU 400. Temperature Sensor 485 monitors the internal temperature of the system warning of possible overheating whilst load switch 487 makes it possible to remove power from sensors 410, 411, 412, 414, ZigBee module 436, MCU ADC 402 and other systems not always needed to conserve power when these systems are temporarily shut off whilst load switch 489 makes it possible to power down BlueTooth module 434, GPS 442, LCD screen 24 as well as backlight for screen 24.

Figure 16:
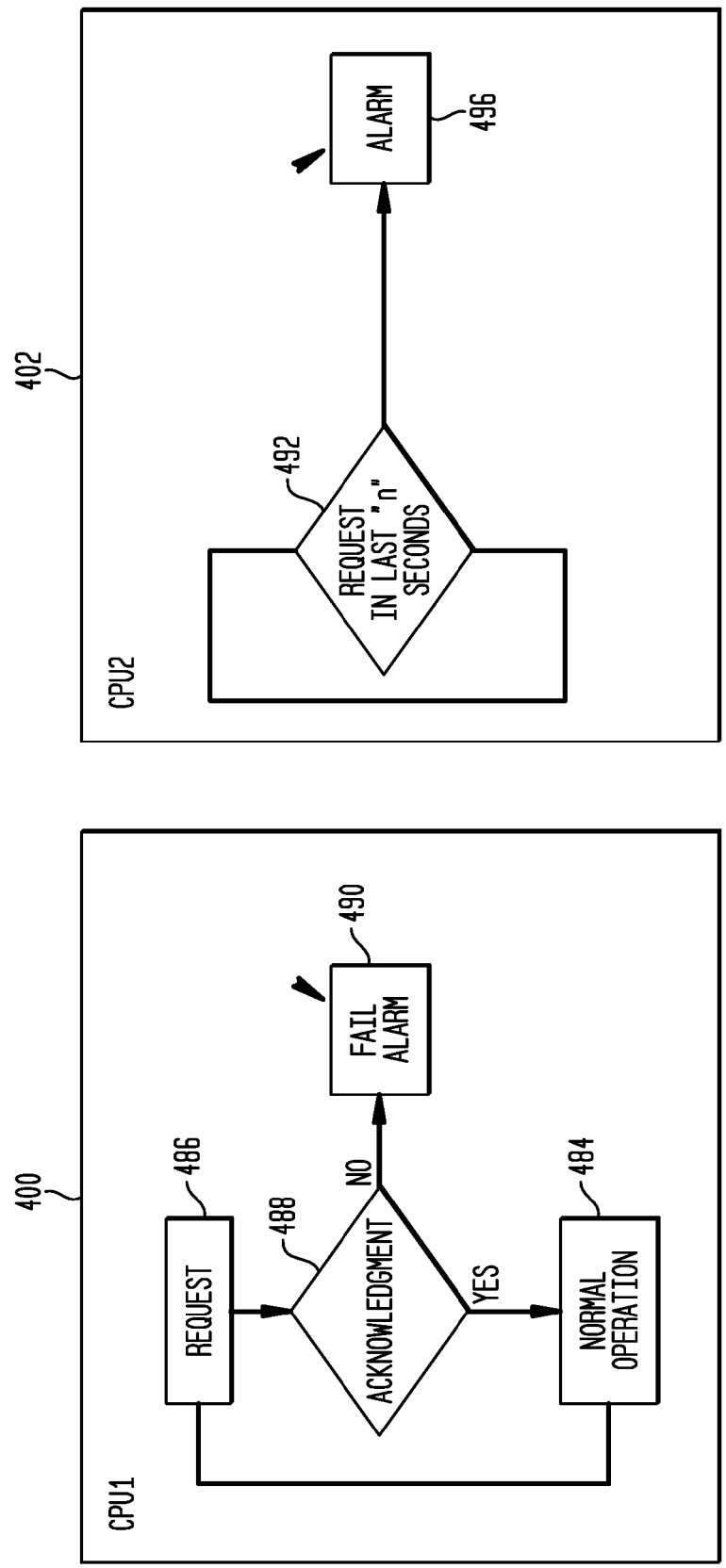
FIGS. 16 and 17 illustrates the logic flow diagram governing the interaction between redundant CPU's in a preferred embodiment of the present invention in an alarm situation where one of the CPU's has become inoperative.
Figure 17:
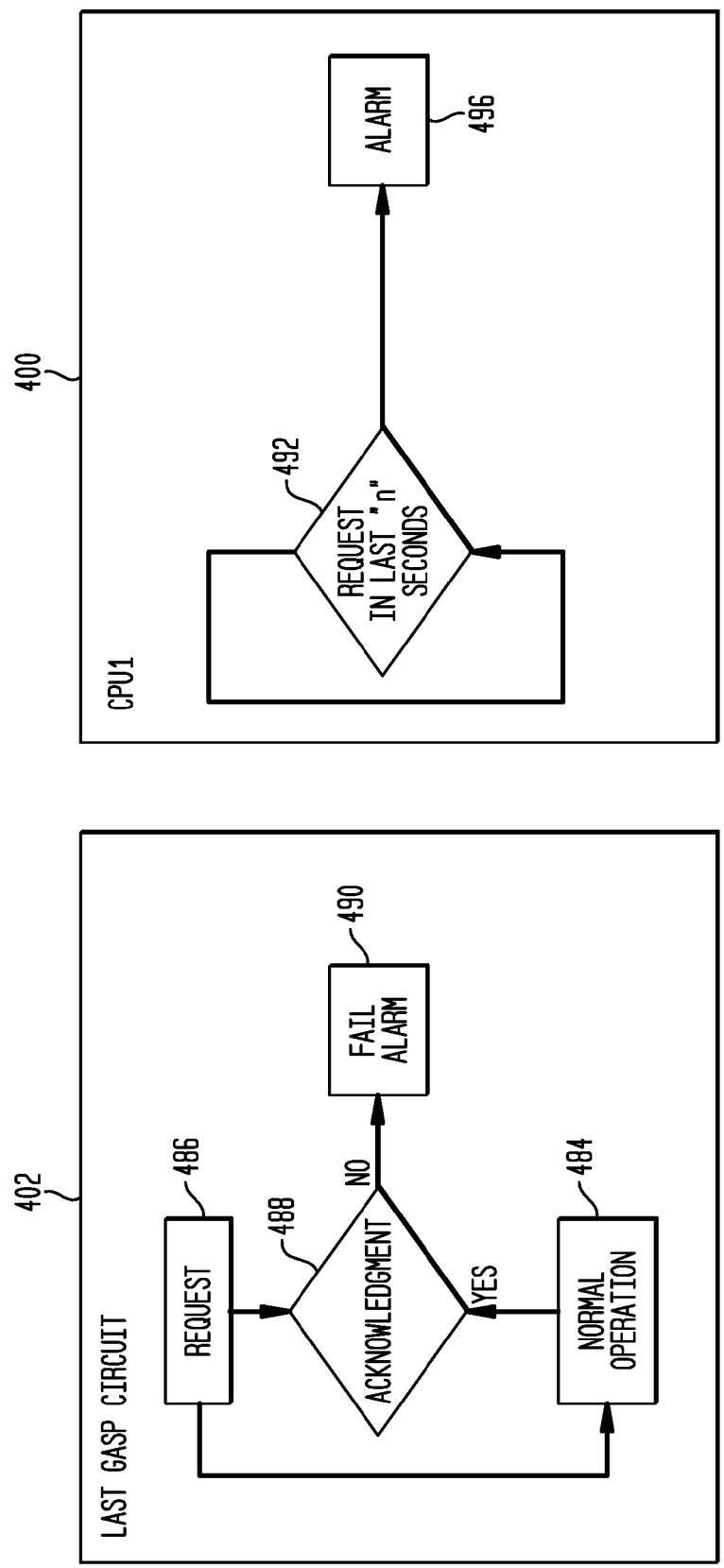

Importantly, MCU ADC 402 also serves to guard against freezes of MCU 400 as the two units 400 and 402 exchange periodic handshakes through lines MCU_INT and AVR_CS. If a handshake request from MCU 400 is not returned, MCU ADC 402 signals MOSFET gate 461 through line MCU_RESET_CTRL allowing signal from reset button 463 to reset MCU 400. Similarly, if MCU ADC 402 fails to return a handshake request from MCU 400, MCU ADC 402 is reset by a signal from MCU 400 sent to MOSFET gate 465 allowing reset button 463 to reset MCU ADC 402. This is quite an important feature as it greatly enhances the probability that neither MCU 400 nor MCU ADC 402 will be inoperative when urgently needed. Conveniently, each of processors MCU 400 and MCU ADV 402 will attempt to reset the other a small reasonable number of times, up to 3 in our most preferred embodiments, and if those attempts are all unsuccessful will trigger an alarm as illustrated in FIGS. 16 and 17.

A particularly important interaction between the APPAPS monitors and the safety network is that the safety network maintains an awareness of the location and programming of the APPAPS unit to the extent that it is possible to do so, enabling it to monitor updating of the software and firmware on each monitor. Desirably, the safety network checks the firmware and software of each APPAPS monitor when it is charging in a safezone like the site office overnight and updates both as needed. Importantly since the safety network is aware of the location of each APPAPS monitor when it is in the safezone, it is able to sound an alarm if an APPAPS monitor is removed from the safezone with out-of-date software or firmware or any other malfunction which would interfere with its effectiveness. Inasmuch as APPAPS monitors exist for the purpose of saving lives by detecting hazards which may not be easily perceptible by the user, if MCU 400 or MCU ADV 402 fails or some other failure occurs that deactivate sensors 410, 411, 412 and 414, MCU ADC 402 is programmed to trip codec 415 to sound an audible alarm upon freeze or inoperability of if no response has been received from MCU 400 in some small number of seconds, preferably between about 1 and 10 in our most preferred embodiments as illustrated in FIG. 16. Similarly, MCU 400 is programmed to trip squarewave oscillator 417 to sound an audible alarm upon freeze or inoperability of if no response has been received from MCU ADV 402 in some small number of seconds, preferably between about 1 and 20 seconds in our most preferred embodiments as illustrated in FIG. 17.

Figure 5:
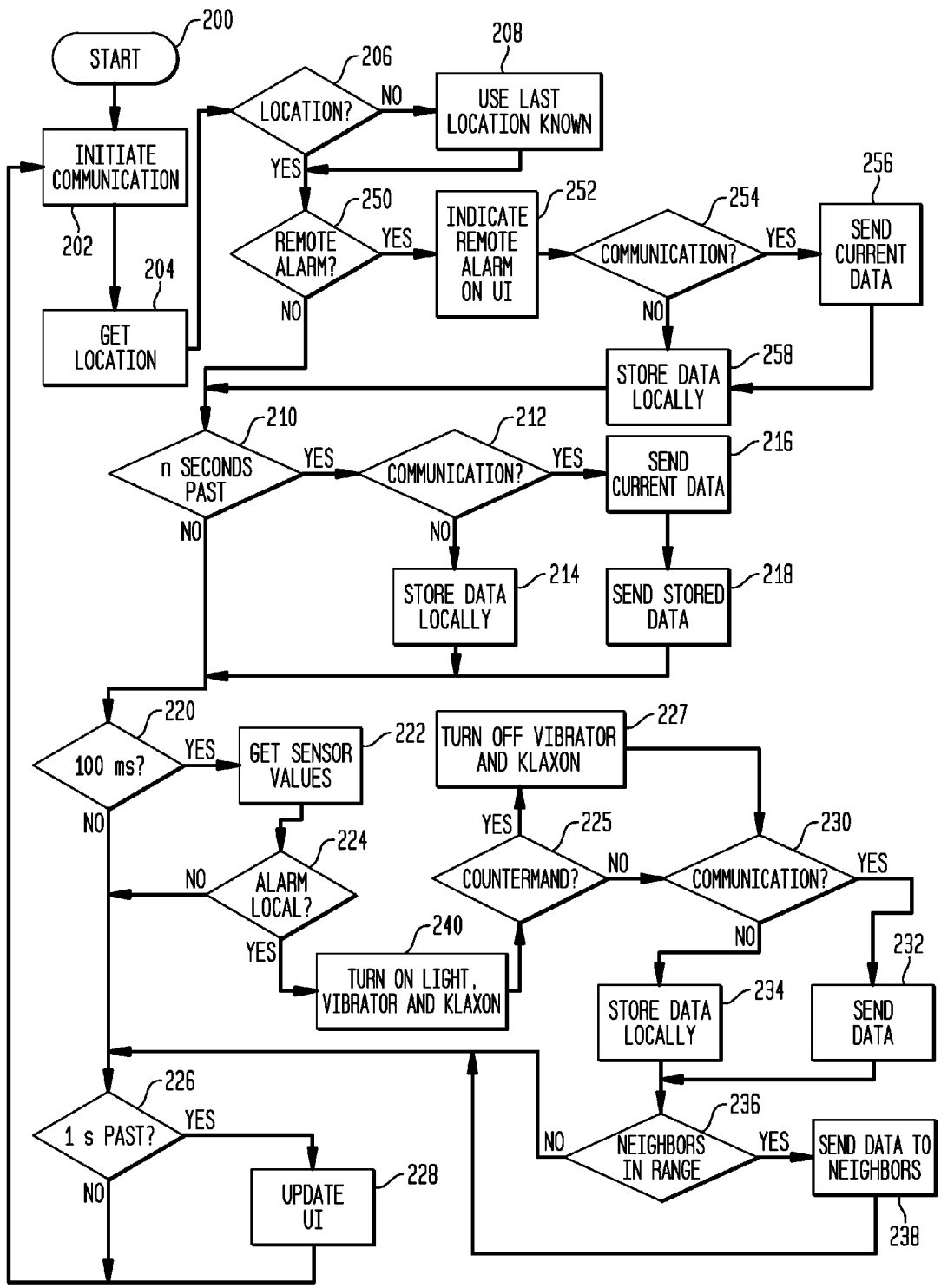
FIG. 5 is an operational logic flow diagram of the operation of the APPAPS monitor.

FIG. 5 presents the combined logic flow chart illustrating the response of the APPAPS monitor to various inputs. Program initiation begins at block 200 which powers on the circuits for APPAPS monitor 20 upon pressing of power on button 26 on the front surface of case 32. Immediately upon startup, block 202 initiates communication set up and, upon conclusion thereof passes to block 204, which checks for the current location of APPAPS monitor 20 by querying block 206 which attempts to obtain an accurate position fix using the procedure detailed below in FIG. 6. In the event that block 206 is unable to acquire a suitably accurate position fix, it queries block 208 for the last known location. After attempting to determine its location, APPAPS monitor 20 checks to determine whether it is receiving an alarm signal from a neighboring APPAPS monitor or the central safety network at block 250. In the event that a remote alarm is being received, block 252 updates the local user interface, then passes control to block 254, which seeks to determine if APPAPS monitor 20 is capable of communicating with the centralized safety network. If APPAPS monitor 20 is in communication with the centralized safety network, the sensor readout of APPAPS monitor 20 is passed to the central databank at 256. If not, the sensor readout and an indication of the remote alarm condition is stored in the local database at 258. In either event control is passed to block 210 thereafter.

In normal operation in which no APPAPS unit is sending an alarm signal, after passing through Block 250, control then passes to block 210, which, after a predetermined period of time has passed, queries box 212 to see whether communications have been received. In the event that no communications have been received, block 214 writes current sensor data to the APPAPS monitor's local (internal) database. If communications have been established, block 212 has block 216 send the relevant stored data to the centralized database. In either event, control then passes to block 220, which evaluates sensor data from block 222, to determine whether a local alarm condition should be registered by block 224. In normal operation, where no local alarm is indicated, control then passes to block 226 which after one second initiates an update of the user interface and passes back to communications initiation in block 202.

If a local alarm has been initiated due to local sensor data, unless countermanded at 225, block 224 passes control to block 230, which checks for communications to the centralized database. If APPAPS monitor 20 is in communication with the central safety network and until the alarm condition has been abated, it forwards the alarm and relevant data to a central database. If there are no communications to the centralized database, block 230 stores the data locally at block 234 and checks to see whether neighboring APPAPS monitors or local wireless network access points are within communication range in block 236. If neighboring APPAPS monitors or local wireless network access points are in communication and the alarm has not been countermanded locally, block 236 sounds the alarm to those neighbors. If no neighbors or local wireless network access points are in range, block 234 updates the local user interface alarm at block 240 and passes control to block 226.

Figure 6:
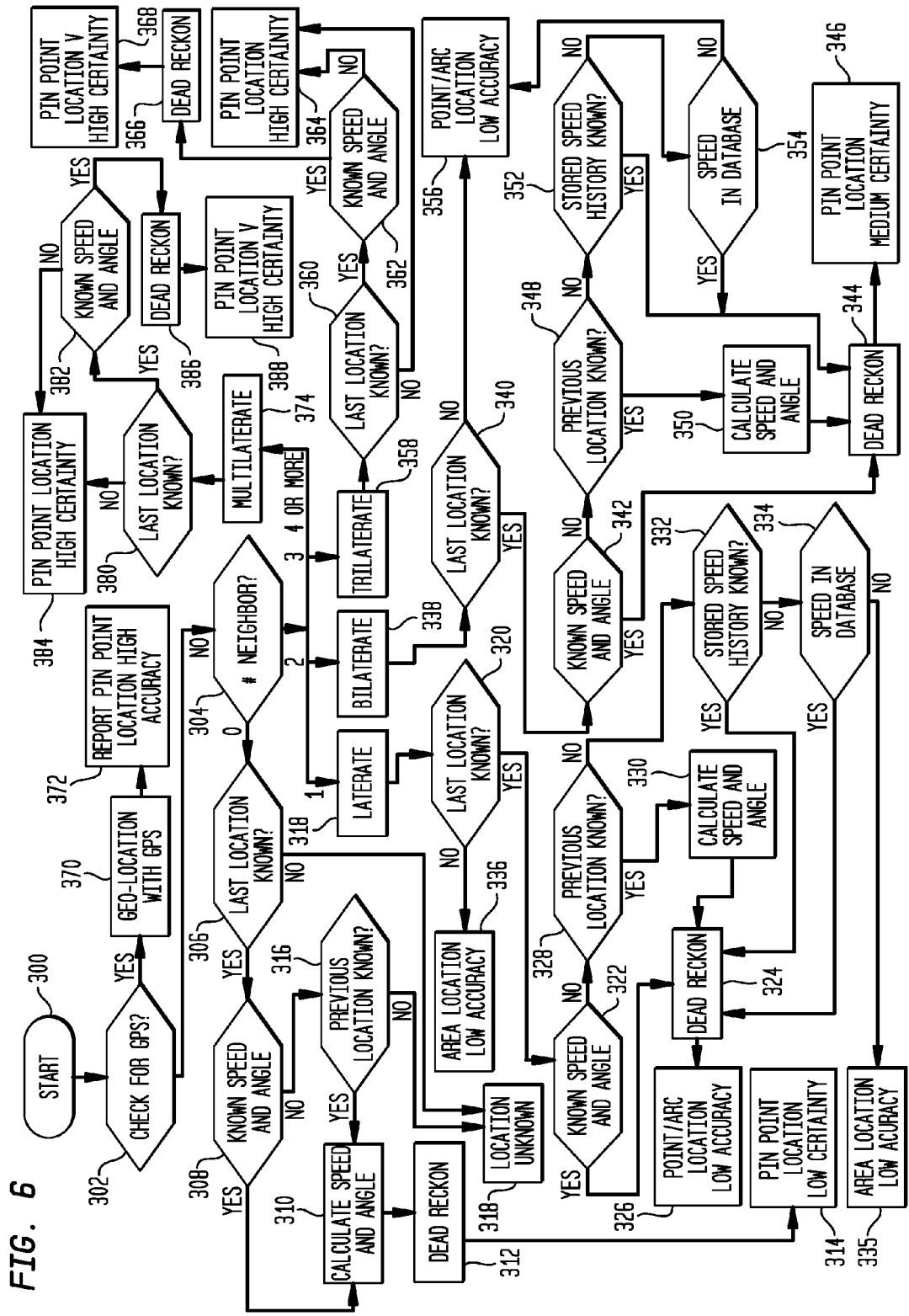
FIG. 6 is a logic flow diagram of the steps involved in the multiply redundant geo-location undertaken by an APPAPS monitor.

An important aspect of the APPAPS monitor's functionality lies in its extremely thorough and refined geo-location capabilities. As Shown in FIG. 6, the APPAPS monitor searches for many different indicia of its location, relying not only on its GPS functionality, but also upon references to known locations of other functionally similar APPAPS monitors in communication therewith. As shown in FIG. 5, the APPAPS monitor checks its location frequently so that in an emergency, not only can its location be determined in the case in which its user is in a hazardous situation but also for help in identifying the position of other APPAPS monitors to increase the chances that the location of a hazard experienced by another APPAPS user can be accurately assessed and that those closest to the hazard situation can be advised thereof, and respond appropriately. In view of the vast computing and storage power Incorporated in even the most modest of microprocessors, we find it convenient to update location data frequently, preferably at least several hundred times per second, although obviously updating at far lower rates can still be sufficient.

Each time location is queried in FIG. 5, the APPAPS monitor responds as shown in FIG. 6 by starting at "Start" position 300 and proceeding to check at 302 for a GPS location from either of the 2 GPS functionalities built into the APPAPS monitor at 370, direct from satellite location and cellular network GPS location. If a GPS location can be determined for the APPAPS monitor, that location is generally specific enough that the subroutine need go no further, and a report of the GPS determined location is returned to the APPAPS monitor the central safety system, as well as other APPAPS monitors in communication therewith and an indication is made of the high accuracy of the GPS location determined thereby in 372. If a GPS geo-location cannot be determined as, for example, in the case when satellites are blocked by intervening structure, the APPAPS monitor checks at 304 to see how many of its neighboring APPAPS monitors with known locations are in communication therewith. If no other APPAPS monitor is in communication therewith, a check is made at 306 whether the last location of the APPAPS monitor is known, if so, an inquiry Is made at 308 if the last known angle and speed of the APPAPS monitor's path is known. If so, the speed and angle is revised at 310 in view of the last known location and, at 312, dead reckoning is performed to update the last known location with reporting at 314 of a point location and an indication that the certainty of that point location may be rather low. In the event that a negative result is obtained when the check is made at 308 as to whether there is a known speed and angle value for the APPAPS monitor, a check is made at 316 as to whether a previous location of the APPAPS monitor is known and, if so, a new speed and angle are calculated at 310 to be used in dead reckoning at 312 with the location being reported as point location with low certainty at 314. In the event that there is no previous location known 316, report is made at 318 that the location of the APPAPS monitor is unknown. Similarly, if there is no known last location at 306, the same report is made at 318 that the APPAPS location is unknown. In view of the fact that location is constantly monitored, updated and refined literally on a second by second basis, both with reference to other APPAPS monitors having similarly constantly monitored, updated and refined location information, as well as with GPS information, it can be appreciated that reports without useful location information will be extremely rare and can be avoided by liberal provision of wireless network access points throughout the job site.

If a determination is made at 304 that one neighboring APPAPS monitor with a known location is in communication, the system proceeds to 318 and a position determination is made by RSSI, TDOA or transit time measurement. Thereafter, the system attempts to refine the location information and checks at 320 for a last known location known for the user's APPAPS monitor, and if known, check is made if there is data indicating the last known speed and angle for the APPAPS monitor at 322, and if so, dead reckoning performed at 324, leading to a report at 326 of point/arc location with low accuracy. If there is no known last location at 320, the position is reported at 336 as an area location known with low accuracy. In the event that a last location is known at 320 but the check in 322 for a known speed and angle reports negative results, the system searches for a previously known location at 328. If a previous location is known, speed and angle are calculated at 330, so dead reckoning can be performed at 324 and point/arc location can be reported at 326 with an indication of low accuracy. If there is no known previous location indicated at 328, the system checks at 332 for a stored speed history. If this is known, this data is then used at 324 for dead reckoning and point/arc location with low accuracy is reported at 326. If no stored speed history is found in 332, at 334, the system checks whether there is a speed stored in the database; and, if so, stored speed is used in dead reckoning at 324 and a point/arc location with low accuracy is reported at 326. If there is no speed in the database at 334, an area location is reported at 335 with low accuracy. Again, it can be appreciated that reports providing only area location should be rare in view of the continuous updating of location information by the APPAPS monitor.

If a determination is made at 304 that two neighboring APPAPS monitors with known locations are communicating with the user's APPAPS monitor, the system determines an area location at 338 using RSSI and transit time measurements to obtain an indication of the area where the user's APPAPS monitor is located and attempts to refine that location, beginning at 340 where the system checks for a last known location. If this is found, the system proceeds to check for a known speed and angle at 342; and if this is known dead reckoning is performed at 344, leading to pinpoint location with medium certainty being reported at 346. In the event that there is no known speed and angle at 342, a check is made at 348 for a previous known location. If this is found, speed and angle are calculated at 350 then used at 344 for dead reckoning, leading to report of pinpoint location known with medium certainty at 346. In the event that no previous known location is reported at 348, the system checks at 352 for a stored speed history which can be used at 344 for dead reckoning and a subsequent report of pinpoint location with medium certainty at 346. In the event that no stored speed history is reported at 352, the system checks at 354 for a stored speed in the database, which can be used as before at 344 for dead reckoning and reported at 346 as pinpoint location medium certainty. If no speed can be found in the database at 354, point/arc location with low accuracy is reported at 356 which is also the report made if no last location is known in 340 with the point/arc location with low accuracy reported at 356 being the same determination made in 338 by RSSI and transit time measurements as it was not possible to refine these any further given the lack of stored speed/location information.

If a determination made at 304 that 3 neighboring APPAPS monitors with known locations are communicating with the user's APPAPS monitor, the system determines a pinpoint location using RSSI and transit time measurements which it then attempt to refine by seeing if there is a last location known at 360. If so, the system checks at 362 for known speed and angle, which is used at 366 for dead reckoning, leading to a report at 368 of pinpoint location with very high certainty. In the event that either no last known location is determined at 360 or there is no last known angle and speed at 362, the original un-refined determination made at 358 by RSSI and transit time measurements is reported at 364 as a pinpoint location with high certainty. FIGS. 8-12 illustrate schematically how geolocation is performed and refined in certain special cases following the logic flow set forth in FIG. 6.

Accordingly, it can be appreciated that the APPAPS monitors go to great lengths to determine and maintain useful information relating to their location, along with an indication of the certainty involved in those determinations so that help can be directed to APPAPS users experiencing the hazard situation without unnecessary delay which could be occasioned by lack of information regarding location of the APPAPS monitor and/or the certainty and accuracy that information. It can be appreciated that the system attempts to use direct GPS geo-location, cellular telephony GPS geo-location, RSSI and/or transit time location relative to that of other APPAPS monitors with known locations and that, when a determination of a location is made, the system attempts to refine that by dead reckoning, so that assistance can be provided expeditiously to a user experiencing the hazard situation. While it is almost trite to mention that every second counts in such situations, it can be appreciated that this system attempts to shave literally every last second off of the time that will be required for effective response by ensuring that location is known along with the nature of the hazard, both on the central network and to neighboring users, as accurately as possible.

Figure 7:
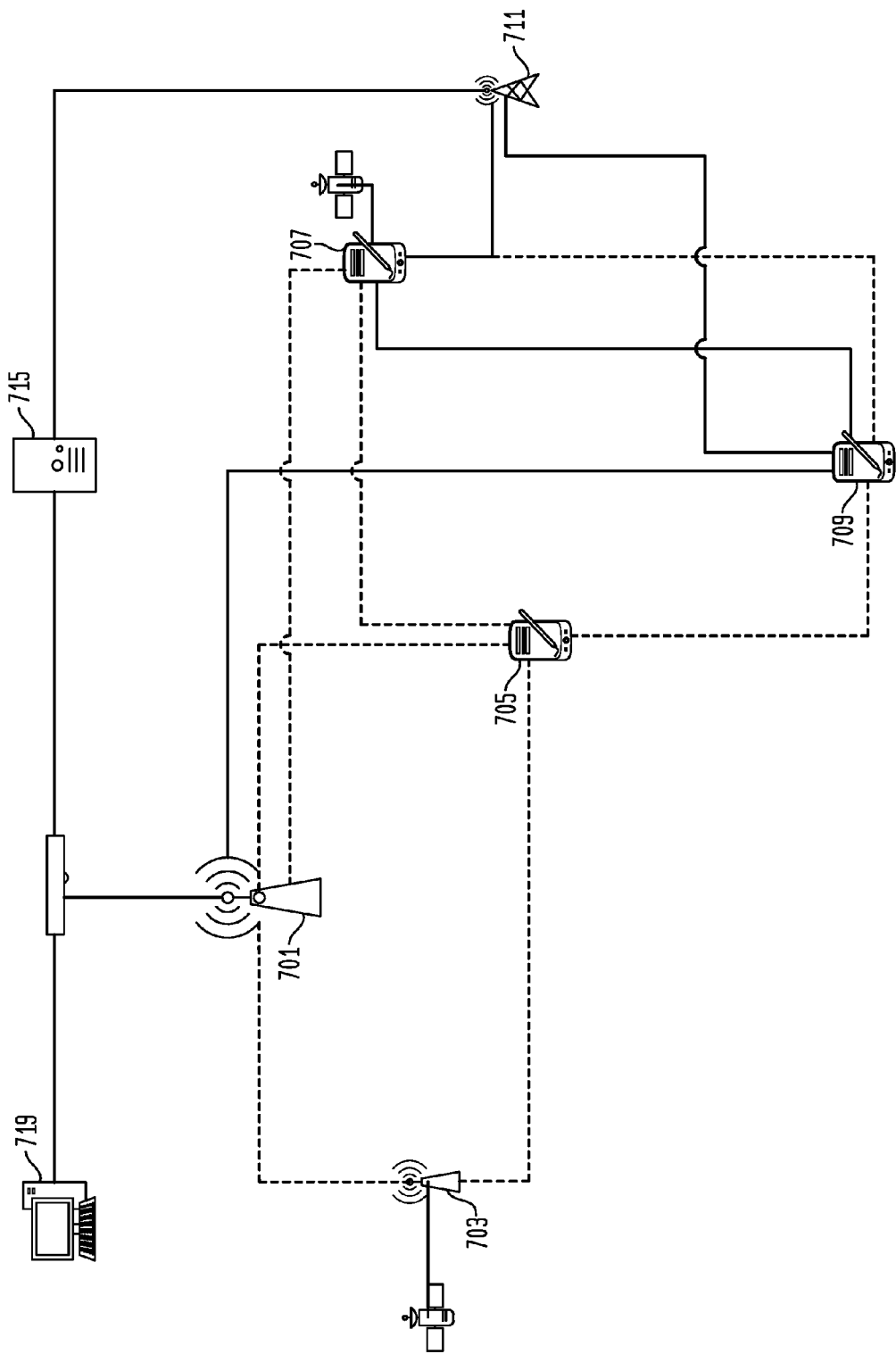
FIG. 7 is a schematic representation of the interactions between one APPAPS monitor and surrounding APPAPS monitors, a mesh network protocol implementation access point (e.g. ZigBee) conversing with a GPS antenna, another APPAPS monitor obtaining a GPS location derived from a cellular network, direct access to a GPS monitor and a mesh network protocol implementation access point access point with a Gateway designated GPS location.
Figure 8:
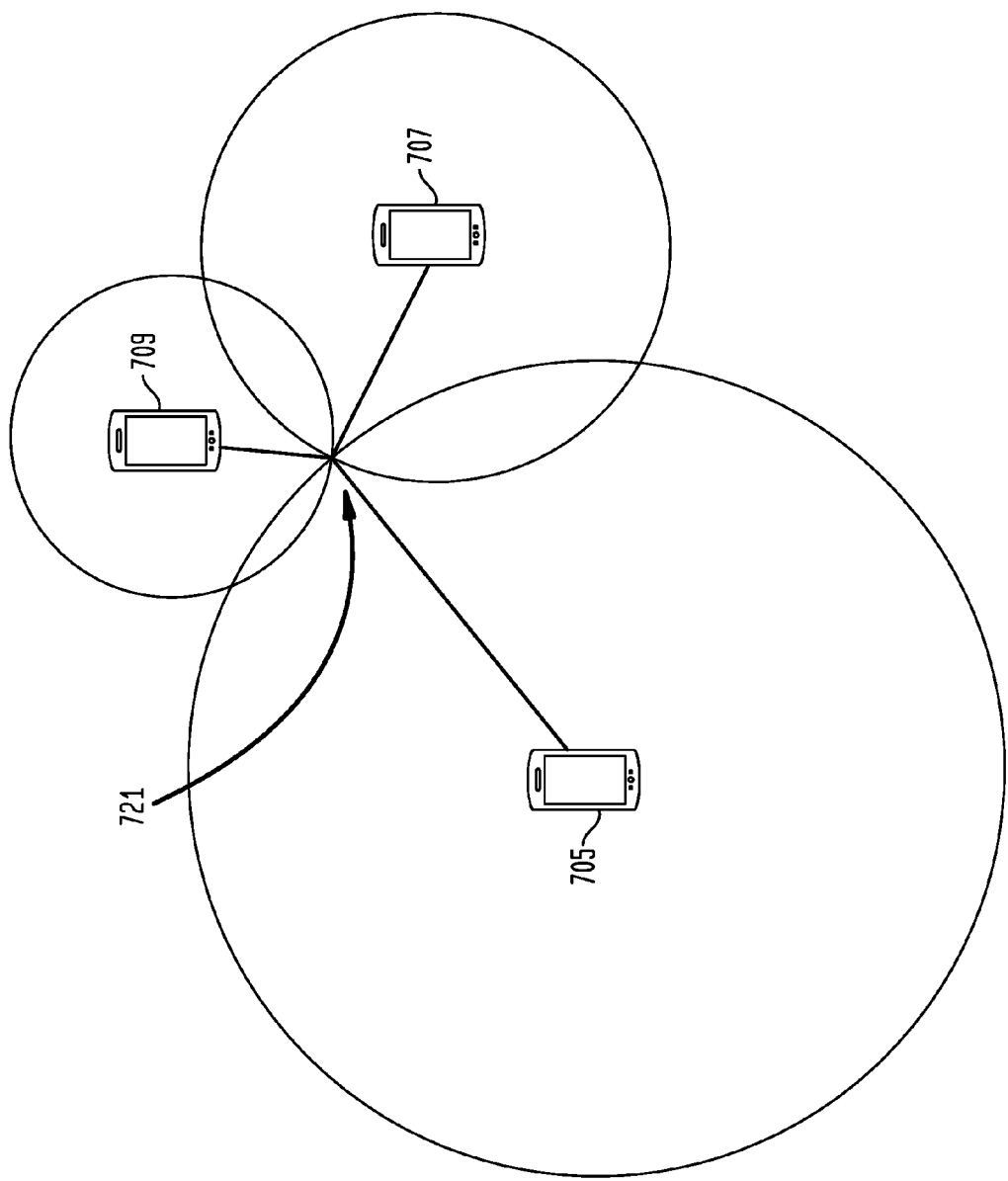
FIG. 8 is a schematic illustrating how the location of the alarmed APPAPS monitor can be determined via RSSI and/or signal transit time measurements when at least 3 other APPAPS monitors are in communication therewith so that the distance between APPAPS monitors can be determined either by transit time of signals between the respective monitors or by RSSI estimation of the relative sensor strength of those signals.

As illustrated in FIG. 7, to eliminate "dead spots" within the facility, it will normally be prudent to liberally array wireless local network access points throughout the site. Currently, the technology of choice for this application is the ZigBee access point, which can also provide GPS functionality. Thus, in cases where normal telecommunication might be blocked or hindered by structures functionally equivalent to a Faraday cage or almost so, the efficient operation of the system can be enhanced by provision of a wireless local area network access point within. Since each APPAPS monitor can serve as a node in the overall mesh network, is possible by prudent distribution of wireless local area network access points throughout the site to ensure that APPAPS monitors will at most rarely be out of communication with their neighbors and/or the central safety network. In FIG. 7, it is contemplated that GSM, the current protocol for wireless telephony throughout most of the world except for North America, will be used, although intellectual property considerations may require the use of other roughly equivalent protocols in some portions of the world; and, of course, these protocols will be supplanted as technology advances and intellectual property expires. Of course monitors sold for use in North America will be adapted to use CDMA, 4G LTE or whatever technology is adopted by the relevant carriers. FIG. 7 illustrates the interaction between two remote local wireless network access points 701, 703, three APPAPS monitors 705, 707, 709, cell tower 711, central loader database and server 715 on safety network 717 and central PC monitor 719. APPAPS monitor 705 can gather location data from both hardwired access point 701 and mobile access point 703 which is GPS enabled, in preferred embodiments satellite short burst data enabled, as well as APPAPS monitor 707 which is in a position in which its GPS module is able to obtain a geolocation fix for APPAPS monitor 707 and cell tower 711. Thus as illustrated in FIG. 8, a geolocation fix can be obtained by trilateration. It can be appreciated that the location of APPAPS unit 705 could be considered overdetermined, or that the various geolocation fixes may be inconsistent. In such an occurrence, the "best" geolocation fix can be determined by averaging the three closest to each other out of four of the fixes and discarding data which is grossly inconsistent with the three fixes. Well-known statistical methods are available for determining when aberrant points in a data set can be discarded. Often, "averaging" of several geolocation fixes will seek to minimize root mean square error between the best estimate and data points considered valid. A well-known phenomenon often requires GPS data to be discounted when a stations reported location suddenly jumps by several meters. This is a frequent occurrence when a GPS module moves indoors after being outdoors in a location where it can "see" several satellites. In such cases, the new reading is properly discarded.

Even though APPAPS monitor 705 is not in direct telephonic communication with cell tower 711 by virtue of the mesh network established by interaction with APPAPS units 707 and 709, APPAPS unit 705 has the ability to contact practically the whole world by virtue of its indirect connection to cell tower 711. Similarly APPAPS monitor 709 is in communication with fixed access point 701, whose position is known, APPAPS monitor 707 whose position is known by virtue of its GPS and APPAPS unit 705 whose position has been determined through his communication with remote access points 701, 703 as well as APPAPS monitor 707.

Use of GPS enabled mobile remote access point 703 can be particularly useful as GPS enabled mobile access point 703 can be placed at a location which is accessible outside of a structure but is also able to communicate with devices inside the structure. Thus, for example, if the user wishes to take APPAPS monitor 703 inside a structure which is substantially or largely equivalent to a Faraday cage, the user can place remote access point 703 in an opening of that structure and thus have both communication with the outside world and at least some geolocation capability when working within the structure.

FIGS. 8-12 illustrate the schema by which various permutations of available information are manipulated to obtain the most precise geo-location estimates practicable.

In FIG. 8, an APPAPS unit experiencing an alarm condition at 721 is in communication three other APPAPS units 705, 707, and 709. By use of RSSI, the location of APPAPS unit 721 may be obtained with high precision by trilateration with high precision from the known locations of APPAPS units 705, 707 and 709.

Figure 9:
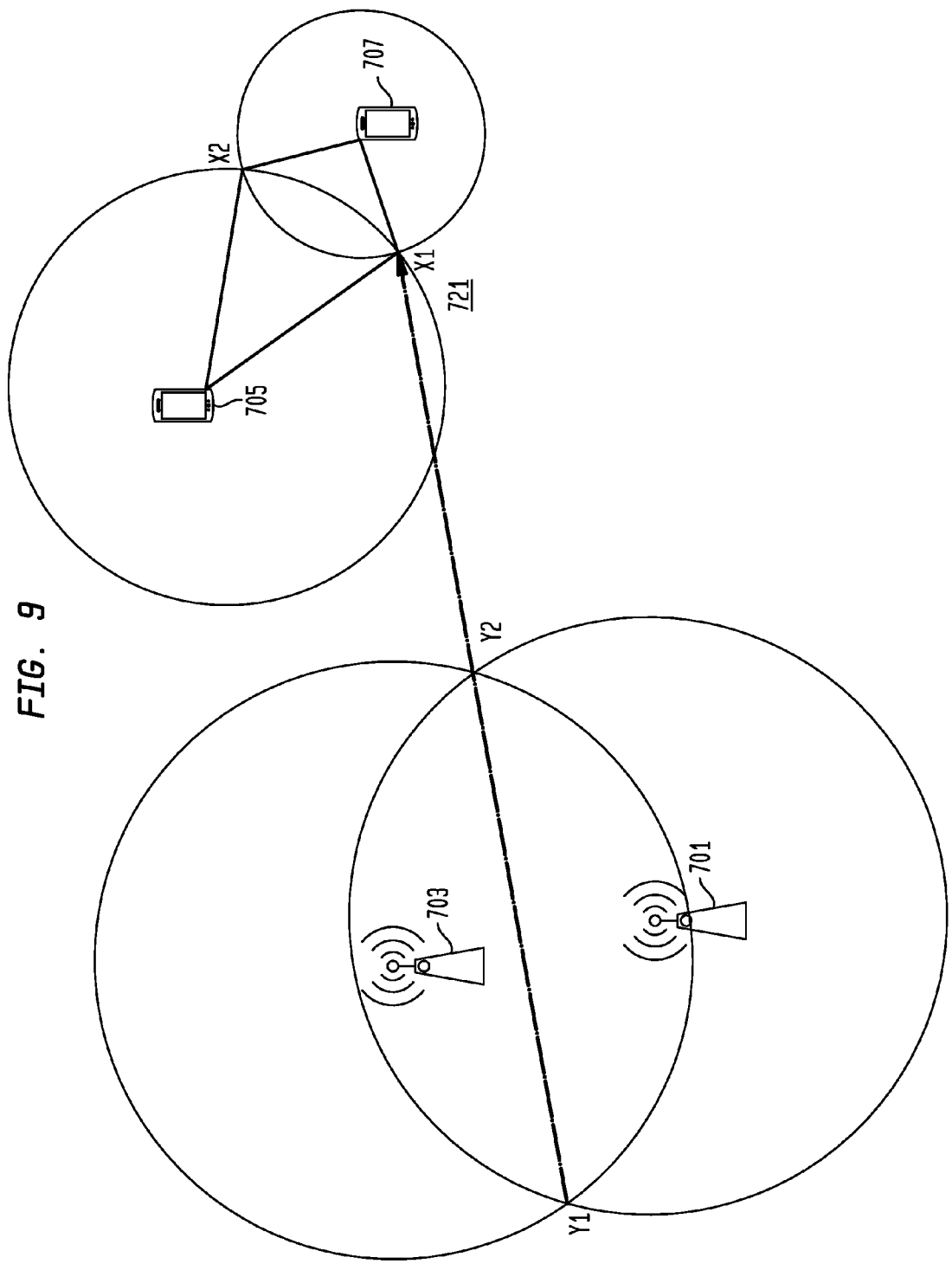
FIG. 9 is a schematic illustrating how the location of the alarmed APPAPS monitor can be determined via a combination of RSSI and/or signal transit time measurement when only 2 APPAPS monitors are in communication with the APPAPS monitor in an alarm situation and a most likely position can be computed based upon the known previous positions of the alarmed APPAPS monitor. In this case, if it is known that shortly prior to sounding an alarm, the APPAPS unit had moved from Position Y1 to Position Y2 but is no longer in contact with either of the units providing the prior location data. From the projected path, it can be appreciated that it is more likely that the monitor in question is at position X1. When further evaluated in view of dead reckoning data provided from the APPAPS monitor in question, the degree of certitude attached to this positional estimate can be greatly increased.

In FIG. 9, it can be appreciated that even though the number of nodes with known positions may not be sufficient for unambiguous determination of location, in many cases when combined with last known position data and data concerning path and direction, one of the two possible locations can be eliminated. In this case, APPAPS unit 721 is receiving signals only from APPAPS units 705 and 707 yielding the two ambiguous possible location fixes X1 and X2. Inasmuch as it is known that APPAPS unit 721 was moving in the direction indicated by the arrow, it can be determined that X1 is the reasonable location fix for APPAPS unit 721.

Figure 10:
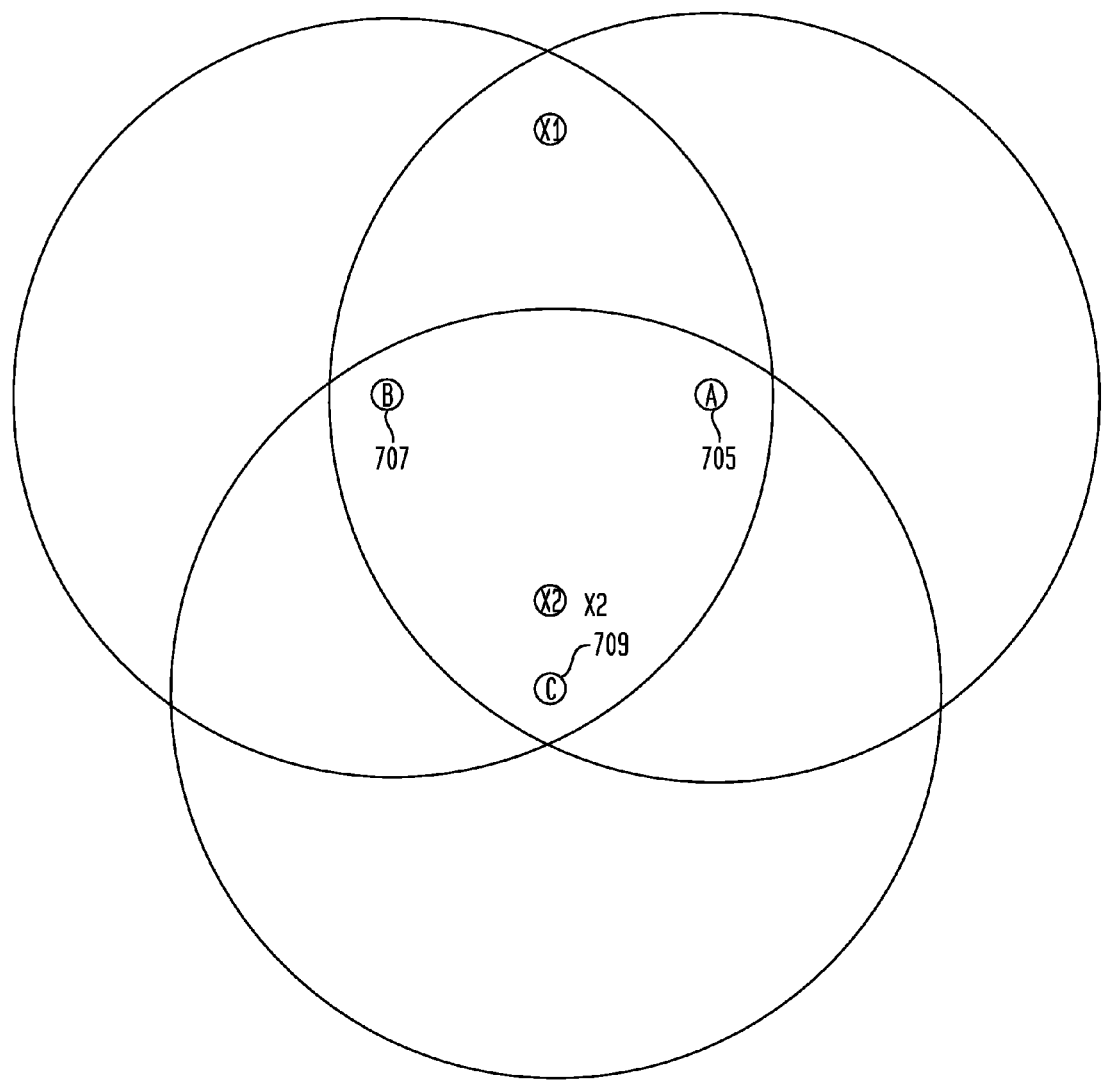
FIG. 10 is a schematic illustrating how most likely locations of the alarmed APPAPS monitor can be determined via a combination of RSSI and signal transit time measurement when only 2 APPAPS monitors are in communication with the APPAPS monitor in an alarm situation by exclusion of possibilities when the alarmed APPAPS monitor is not receiving a signal from other APPAPS monitors in the neighborhood.

In FIG. 10, it can be appreciated that if the system is able to communicate with all of the APPAPS units 705, 709 and 707 in the network that are in proximity with the unit that sounded the alarm, then it will be possible to choose between two ambiguous location fixes based upon absence of data only available to the APPAPS unit sounding the alarm through the mesh network but not available directly to that unit directly from an APPAPS unit which is out of range from the alarmed unit. In this case, APPAPS unit 721 is only in communication with APPAPS unit 705 and 707. By virtue of the fact that APPAPS unit 721 is not in communication with APPAPS unit 709, it can be determined that X1 is the only logical location fix of the two ambiguous fixes.

Figure 11:
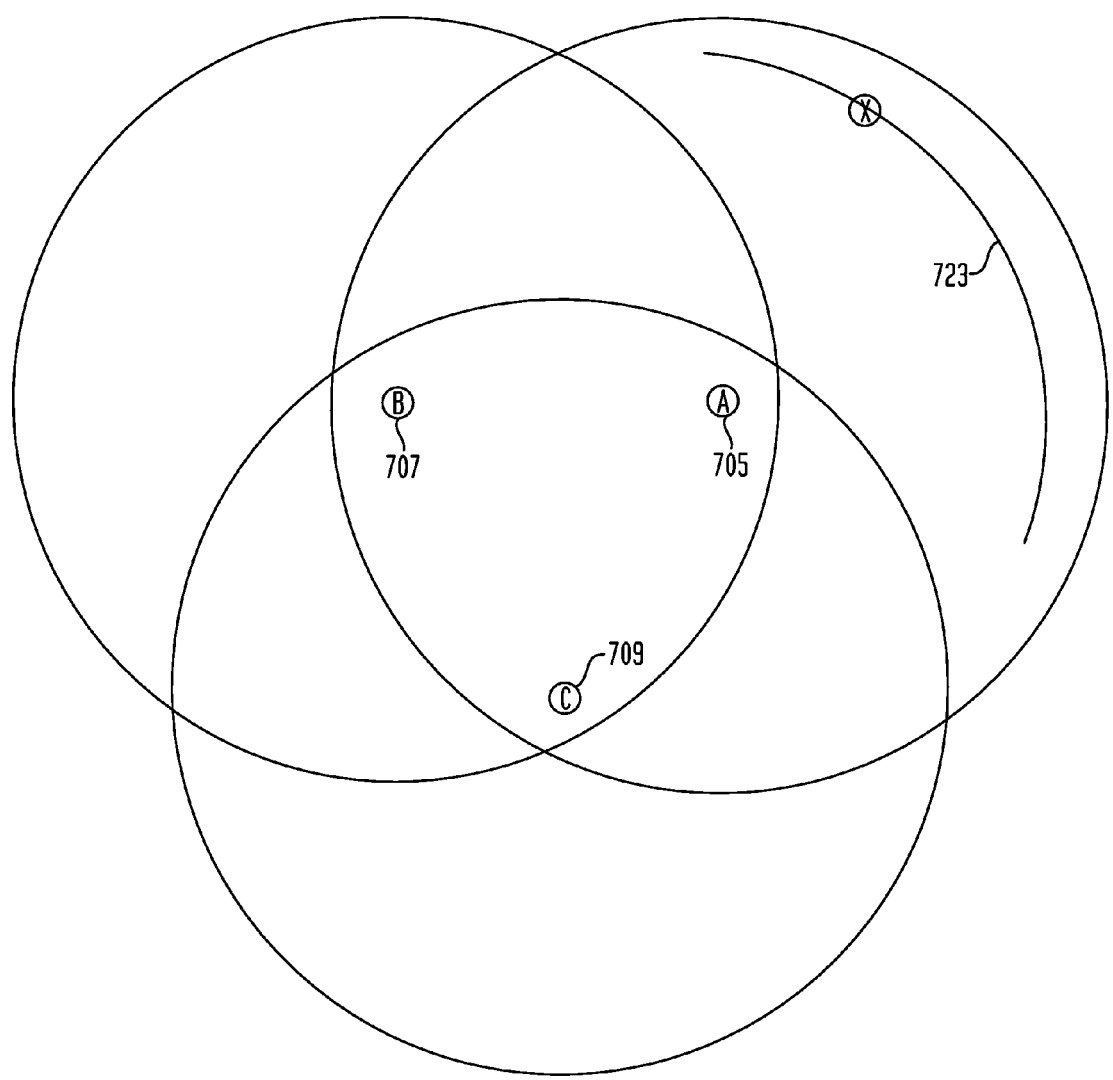
FIG. 11 is a schematic illustrating how the location of the alarmed APPAPS monitor can be estimated when in communication with only one APPAPS monitor by exclusion from the areas of coverage of 2 other APPAPS monitors.

In FIG. 11, APPAPS unit 721 is experiencing an alarm situation. Inasmuch as APPAPS unit 721 is only receiving signal from APPAPS unit 705 but is not receiving signals from APPAPS units 707 and 709, the location of APPAPS unit 721 can be determined to be somewhere along the arc 723 indicated. In most cases, it will be possible to narrow the possible positions upon that arc based on dead reckoning from the gyroscopic and accelerometer modules contained in APPAPS unit 721.

Figure 12:
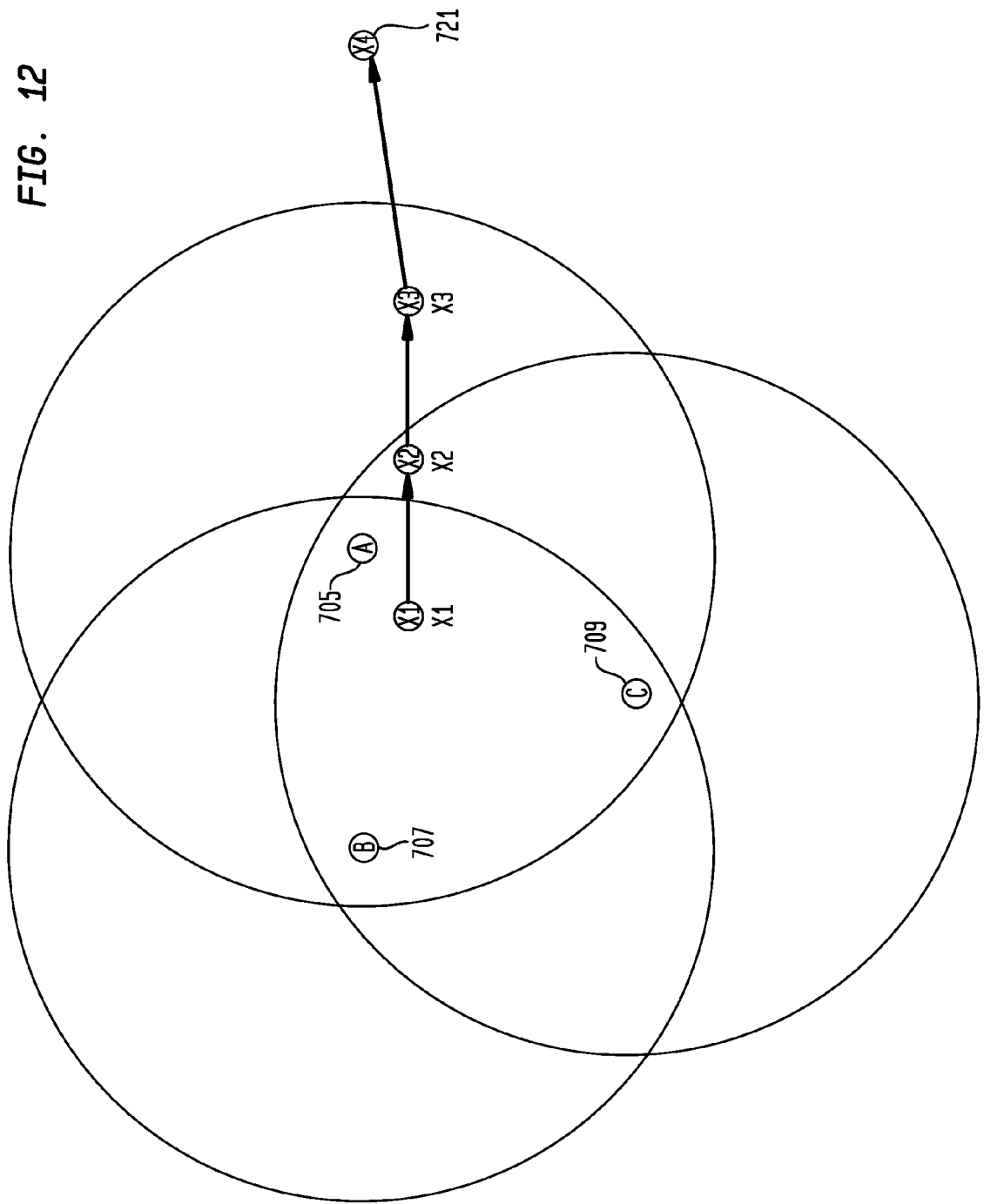
FIG. 12 is schematic illustrating how the location of the alarmed APPAPS monitor can be estimated from a previously known location using dead reckoning.

In FIG. 12, APPAPS unit 721 experiencing alarm has previously been in communication with APPAPS units 705, 707 and 709. Though no longer in communication with any of these, it is still possible to obtain a reasonable prediction of APAP unit 721's location based upon its previously known locations and dead reckoning data.

Figure 13:
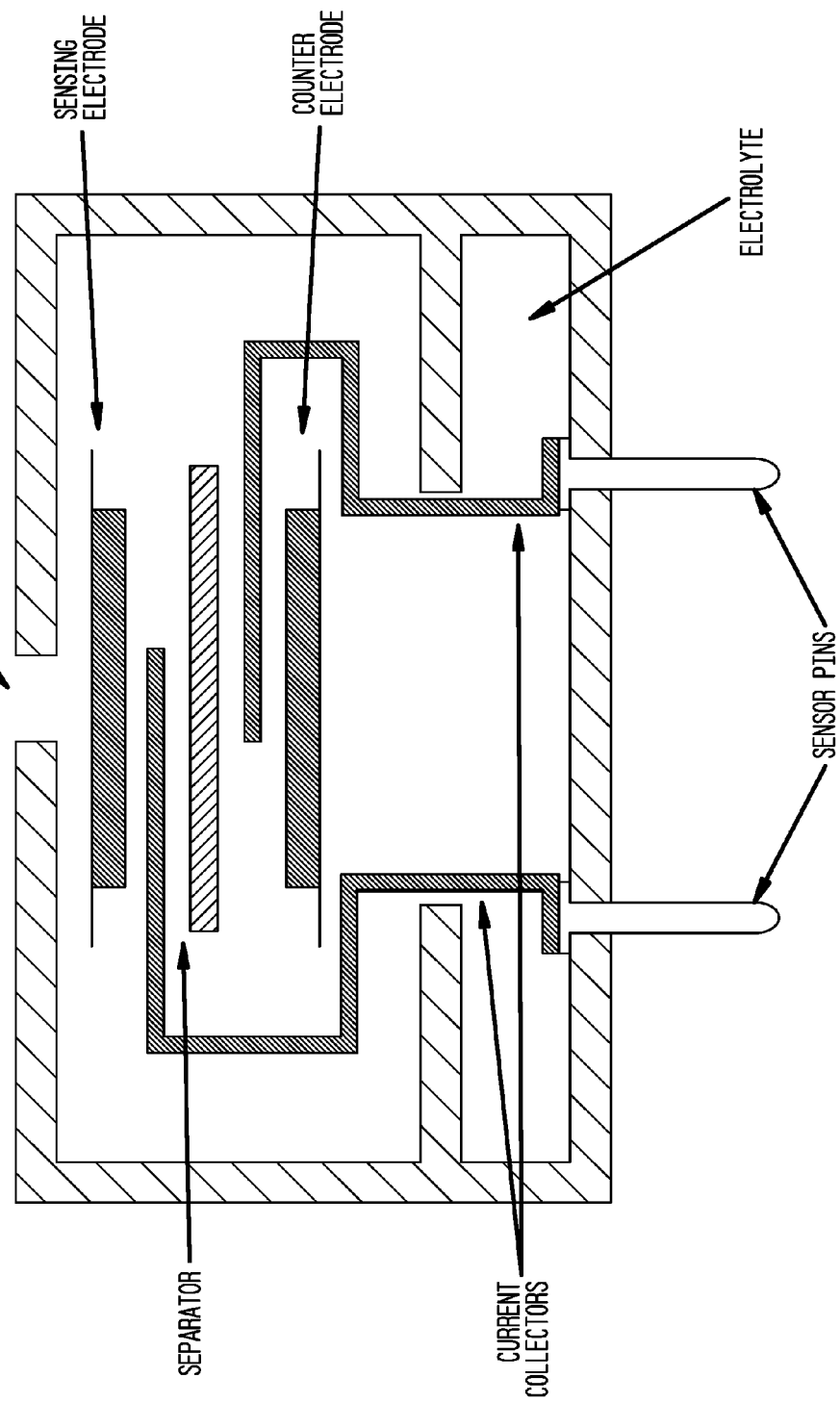
FIG. 13 schematically illustrates a "sniffer" used in the present invention to detect the presence of toxic contaminants in the atmosphere, as well as to measure the temperature of the atmosphere.

FIG. 13 is a schematic illustration of the cross-section of a gas detector used in the present invention. Suitable gas detector sensors are available from City Technology Limited, and are described in detail in U.S. Pat. No. 8,691,066; U.S. Pat. No. 7,541,587; U.S. Pat. No. 7,534,333; U.S. Pat. No. 7,282,168; U.S. Pat. No. 7,279,080; U.S. Pat. No. 7,236,095; U.S. Pat. No. 5,761,952; U.S. Pat. No. 5,746,899; U.S. Pat. No. 5,668,302; U.S. Pat. No. 5,632,875; U.S. Pat. No. 5,234,567; U.S. Pat. No. 5,070,721; U.S. Pat. No. 4,829,809; U.S. Pat. No. 4,815,316; U.S. Pat. No. 4,633,704; U.S. Pat. No. 4,324,632; and U.S. Pat. No. 4,432,616, as well as U.S. Pat. No. 6,481,264; U.S. Pat. No. 6,395,230; U.S. Pat. No. 6,046,054; U.S. Pat. No. 5,811,662; U.S. Pat. No. 5,601,693, all of which are hereby incorporated by reference.

In operation, APPAPS 20 will continuously monitor the local atmosphere for both hazardous gases, particularly carbon monoxide, hydrogen disulfide and flammable gases such as volatile hydrocarbons as well as the presence of oxygen in sufficient amounts for human respiration. In particular, the system regularly checks the levels of volatile hydrocarbons to ensure that levels approaching the lower explosive limit are detected and an alarm sounded to prevent explosion. In cases where other hazardous gases may be present, capability for monitoring of those gases can be added, but the typical industrial site can be well served by monitoring for the 4 gases mentioned. In preferred embodiments, the accelerometer will be capable of affecting falls, and serving as a pedometer, while the geo-location system will also provide altitude and speed data as many, if not most, industrial and/or mining facilities will have numerous levels.

Figure 14:
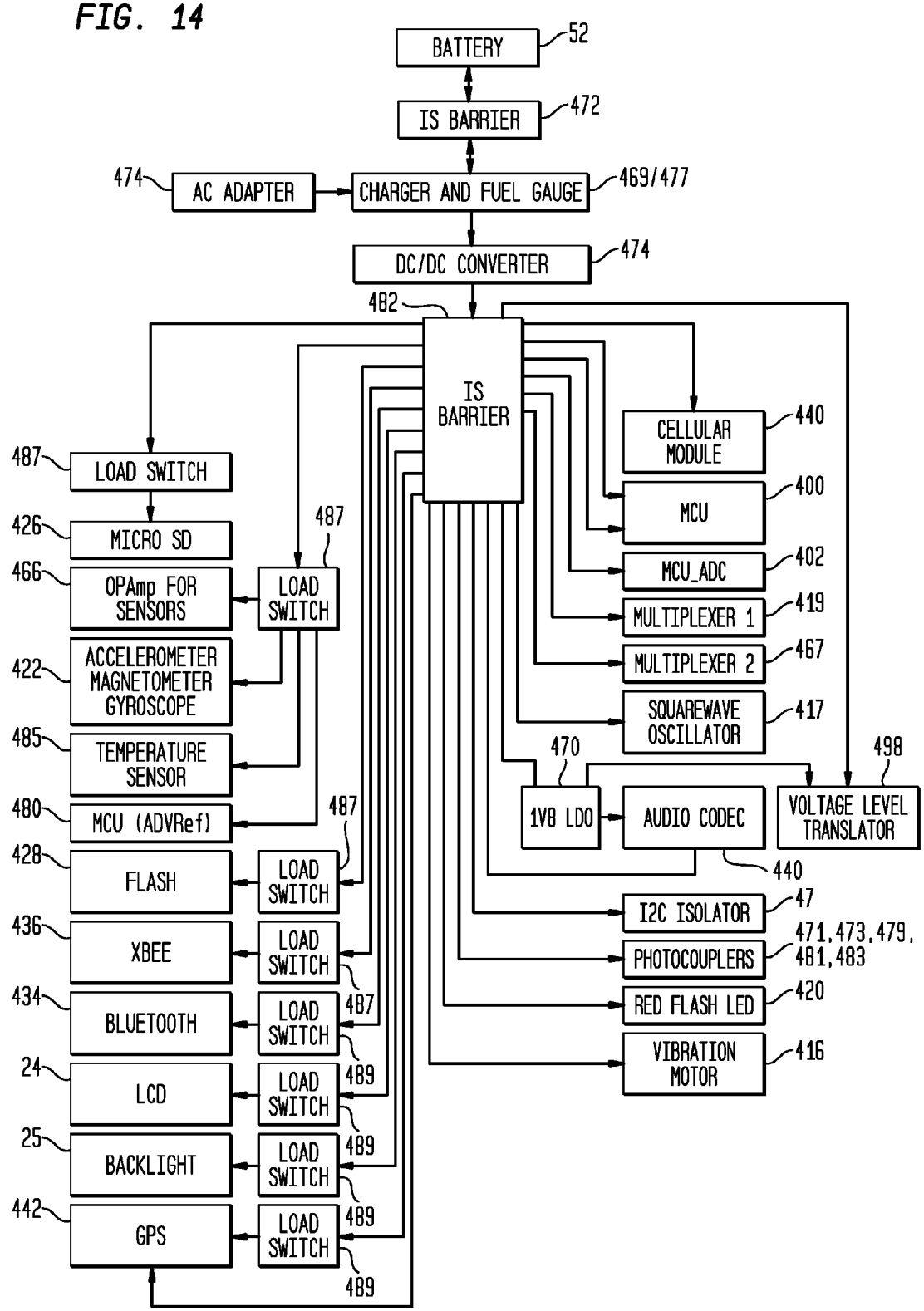
FIG. 14 schematically illustrates the interconnection of the power supplied to the various modules of the most preferred embodiment of an APPAPS monitor.

FIG. 14 illustrates the power supply from battery 62 through intrinsic safety barrier 472 through the charger and fuel gauge circuitry 469/477 voltage regulator 474 and intrinsic safety barrier 482 to the various modules of the APPAPS monitor: Cellular module 440, MCU 400, MCU ADC 402, multiplexers 419 and 467, square wave oscillator 417, voltage level translator 498, Audio Codec 440, low dropout voltage regular 470, I2C bus 47, photocouplers 471, 473, 479, 481, 483, red flashing warning LED 420, vibration motor 416; whilst ganged load switches 487 and 489 make it possible to temporarily remove power consuming modules from the system when they are not needed. In particular, Micro SD 426, operational amplifiers 466 used to convert the outputs of sensors, accelerometer, magnetometer and gyro unit 422, internal temperature sensor 485, bus 480 used to establish the reference voltage for the CPU's 400 and 402 can all be powered down through ganged switches 487, while ganged switches 489 can power down flash memory 428, ZigBee 436, BlueTooth Modules 434, LCD screen 24, backlight 25 for LCD screen 24 and GPS 442.

Figure 15:
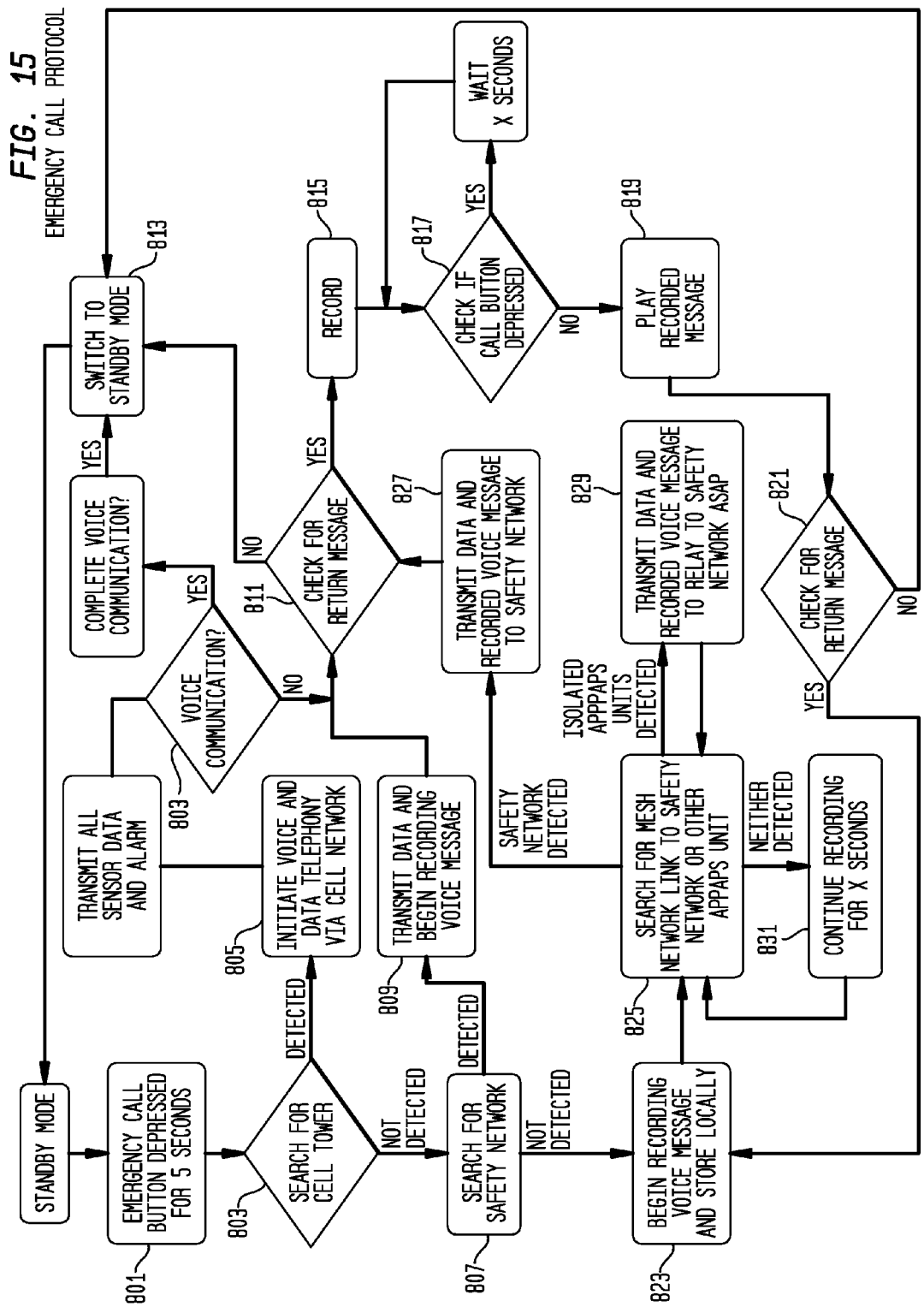
FIG. 15 illustrates the implementation of the Emergency Call Procedure in the most preferred embodiments of the APPAPS monitor.

FIG. 15 illustrates the flexibility of communication which is particularly important in a situation when lives are threatened and even a few minutes—even seconds—can be significant in whether a life can be saved. Accordingly, the APPAPS monitors of the present invention feature multiple modes of communication: both telephony for transmission of voice, short messages, and automatic data transmissions when a hazard is detected in any APPAPS monitor in communication with the network. At the present state of technology, telephony over wireless networks using ZigBee protocol for its wireless network access points does not support full duplex voice telephony—where both parties can talk and listen at the same time. Further in an emergency situation, we consider it important that a worker exposed to a danger or cognizant of danger to another be able to communicate without undue complications. In our preferred embodiments, an APPAPS user can initiate voice and data communication by pressing and holding a single button or switch on the device with communication being determined in connection with FIG. 16 in which Push To Talk (PTT) is initiated by pressing the PTT button 28 at 801, whereupon the APPAPS monitor checks for cellular connectivity at 803. If a cell tower is detected, communication is established at 805. If no cell tower is detected, the APPAPS monitor searches for the safety network through the mesh network at 807. If communication with the safety network is established, sensor data is transmitted and voice data is recorded for transmission in half duplex mode at 809. Once the voice data is transmitted, APPAPS monitor checks for a return message at 811. If there is no message, the APPAPS monitor communication module enters standby mode at 813. If there is a return communication from the safety network, the APPAPS monitor records the return message at 815 whilst checking the status of the Emergency Call Button 28 periodically at 817 for playback at 819 as soon as the PTT button is released. After the message has been played, APPAPS monitor checks for a return message from the APPAPS unit to the safety network at 821 and returns to standby mode at 813 if there is no return message. If there is a return message, it is recorded at 823 for transmission, at 825 the system looks for to the safety network, transmits at 827 if the system is found, if isolated APPAPS units are found, the message is transmitted at 829 for relay, continues recording at 831 if not.

In situations where the APPAPS monitor's sensors are not indicating at hazard situation but there is urgent need of assistance, man-down button 30 is depressed and the monitors follows the procedure of FIG. 15 but transmits a pre-recorded man-down/distress signal in addition to the local sensor data and triggers an alarm in all units receiving the man down/distress signal. To ensure that the safety network is not clogged with routine communications not related to safety, APPAPS units will often be programmed to only accept calls from specified numbers and will only be capable of accessing the safety network for outgoing messages.

Figure 18:
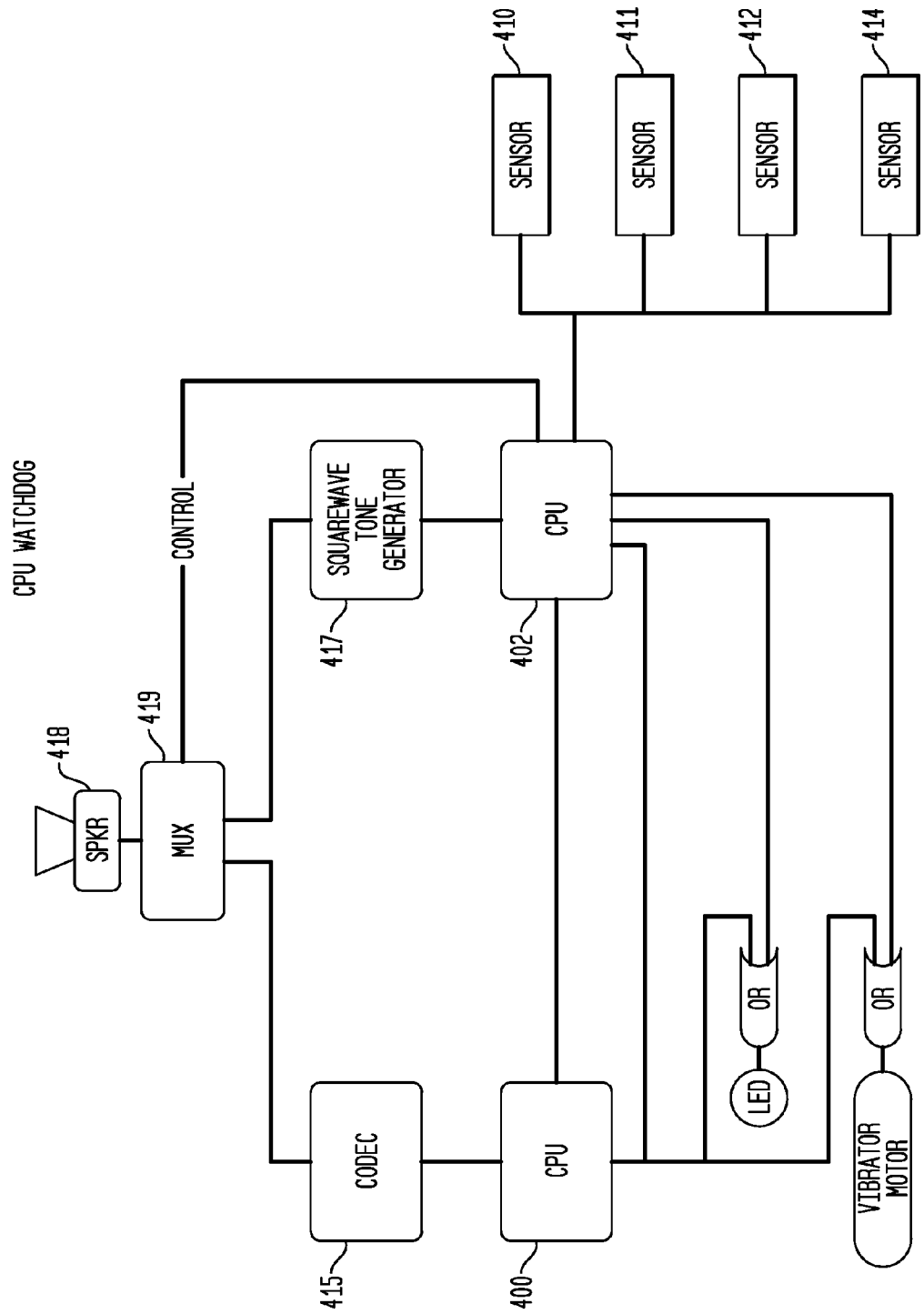
FIG. 18 illustrates the interaction of the two processors in an APPAPS monitor in an embodiment using them in a CPU watchdog configuration.

FIGS. 16, 17 and 18 illustrate the logic of alarms used to alert the user and the safety network to systems failure that could largely negate the protection provided by the systems in APPAS modules 20. In FIG. 16, MCU 400 regularly requests a handshake at 486 from MCU ADC 402 which if acknowledged at 488, returns the system to normal operation. If the handshake is not acknowledged at 488, after repeated attempts to reset MCU ADC 402, failure alarm 490 is sounded. For its part, if MCU ADC 402 has not received a request for a handshake in "n" seconds, alarm 496 is sounded. Similarly, in FIG. 17, MCU ADC 402 regularly requests a handshake at 488 from MCU 400 which if acknowledged at 488, returns the system to normal operation. If the handshake is not acknowledged at 488 after repeated attempts to reset MCU 400, failure alarm 490 is sounded. For its part, if MCU 400 has not received a request for a handshake from MCU ADC 402 in "n" seconds, alarm 496 is sounded. FIG. 18 illustrates the interconnection between CPU's 400 and 402 enabling each to use the same alarm system to sound an alert.

In FIG. 17, rather than having a backup microprocessor for the entire operation of the APPAPS monitor, an alternative scheme is used with a microcontroller 403 principally capable of sounding a local "last gasp" alarm and transmitting alarm indications in case of even a massive system failure of an APPAPS monitor, however occasioned.

FIG. 18 illustrates interconnection of 2 CPU's 400 and 4021, which interact as illustrated in FIG. 17, wherein in normal operation as indicated in block 484, a request for handshake confirmation of proper operation of CPU 401 is made at block 486 and if no acknowledgment at 488 is received, Fail Alarm 490 is sounded. If acknowledgment at 488 is received, CPU 400 returns to normal operation while CPU 402 sets off alarm 496 if a request for confirmation has not been received at block 492 in a predetermined period of time.

As our invention, we claim:

1. A system for monitoring the safety of personnel on an enterprise site, comprising:
   a plurality of portable, position-aware, personal safety monitors capable of being carried by a user, each monitor having:
      a programmable microprocessor module, including at least two microprocessors, each microprocessor being capable of determining whether the other is operative and initiating a reboot of the other;
      an array of sensors operably connected to said programmable microprocessor module, including at least one atmospheric sensor capable of signals indicative of a hazard condition and a non-hazard conditions;
      a human interface operably connected to said microprocessor module and being capable of displaying graphics and audible signals from one of said microprocessors as well as transmitting inputs to one of said microprocessors;
      a communications module operably connected to said microprocessor module, said communications module being capable of at least:
         data, text and half-duplex voice communication with at least a mesh network of functionally similar monitors;
         serving as a node in a mesh network of monitors; and
         cellular voice, text and data communications through a cellular network,
      a geo-location module operably connected to said microprocessor module said geo-location module including: GPS connectivity, and at least one signal distancing/angulation module chosen from the group consisting of: signal transit time calculator; an RSSI module, a time difference of arrival module; a difference on arrival, and an angulation module; said geo-location module being capable of substantially continuously estimating the position of the device at least:
         directly via said GPS connectivity as well as via the device's own mobile telephony providing assisted GPS capability; and as derived from signals from other functionally similar monitors with known positions in mesh network connected communication therewith; and said signal distancing/angulation module;
      a radio frequency transceiver operably connected to said microprocessor module;
      an antenna operatively connected to said radio frequency transceiver;
      an alarm module, capable of:
      alerting the user directly through the user interface via a sensibly perceptible signal of a hazard condition detected by its sensors;
      automatically and reiteratively, transmitting data through said communication module concerning at least the alarm condition, geo-location and sensor data to other monitors connected to said mesh network for so long as a hazard condition is detected;
      receiving a remote alarm condition is reported by another monitor connected to said mesh network, and responding by:

acknowledging receipt of the alarm condition transmission;

alerting the user of said monitor directly through the user interface via a sensibly perceptible signal of the alarm condition reported by said other monitor;

determining at least an estimated position of said other alarmed monitor;

automatically and reiteratively communicating with additional monitors on said mesh network concerning:

said other monitor's alarm condition;

sensor data communicated by said other alarmed monitor;

data concerning the location of said alarmed monitor;

whether any users have indicated intent to respond to said hazard.

2. The system for monitoring the safety of personnel on an enterprise site of claim 1, wherein said geo-location modules also comprises: an accelerometer and a gyroscope and wherein geo-location estimates derived by GPS and radio can be refined and augmented by known motion of the monitor as determined by the accelerometer and gyroscope.

3. The system for monitoring the safety of personnel on an enterprise site of claim 2, wherein said human interface further comprises a speaker, a microphone, a vibrating motor and an alarm light.

4. The system for monitoring the safety of personnel on an enterprise site of claim 3, further comprising: a central safety network comprising a computer capable of wirelessly communicating with units.

5. The system for monitoring the safety of personnel on an enterprise site of claim 4, further comprising a plurality of wireless local access network points in communication with said computer, said wireless local access network points being capable of communicating with said units and transmitting information regarding the position of said wireless local access network points to them.

6. The system for monitoring the safety of personnel on an enterprise site of claim 5, wherein each monitor comprises a plurality of atmospheric sensors adapted to detect at least oxygen, hydrogen sulfide, carbon monoxide and volatile hydrocarbons and wherein the user of said unit is provided a radio transmission unit having a plurality sensors responsive to the user including at least heartbeat, respiration rate and body temperature operatively connected thereto and communicating wirelessly with said user's unit.

7. The system for monitoring the safety of personnel on an enterprise site of claim 1, wherein each monitor comprises a plurality of atmospheric sensors adapted to detect at least oxygen, hydrogen sulfide, carbon monoxide and volatile hydrocarbons and wherein the user of said unit is provided a radio transmission unit having a plurality sensors responsive to the user including at least heartbeat, respiration rate and body temperature operatively connected thereto and communicating wirelessly with said user's unit.

8. The system for monitoring the safety of personnel on an enterprise site of claim 7, wherein said geo-location modules also comprises: an accelerometer and a gyroscope and wherein geo-location estimates derived by GPS and radio can be refined and augmented by known motion of the monitor as determined by the accelerometer and gyroscope.

9. The system for monitoring the safety of personnel on an enterprise site of claim 8, further comprising a wireless safety network having a central server operatively connected thereto, said central server having a software/firmware update module thereupon capable of determining whether said personal safety monitor has the appropriate software and firmware thereupon and downloading the appropriate software and firmware to said personal safety monitor and wherein each safety monitor comprises a software/firmware maintenance module, operative upon recharging of said personal safety monitor to communicate the version of the software and firmware contained therein to said central server and to update said the software and firmware contained thereupon in response to a download from said central server.

10. The system for monitoring the safety of personnel on an enterprise site of claim 9, wherein said software/firmware update module of central safety server can detect when a safety monitor requiring a software/firmware update has been removed from charging before its software/firmware update has been completed and sounding an alarm to prevent said personal safety monitor from being taken from the charging area.

11. The system for monitoring the safety of personnel on an enterprise site of claim 10, wherein said alarm module of said personal safety monitor maintains a list of safety related addresses and is operative to disconnect all voice communications over said personal safety monitor except communication directed to safety related addresses upon receipt of a hazard alarm from any other personal safety monitor in communication therewith.

12. The system for monitoring the safety of personnel on an enterprise site of claim 9, wherein said alarm module of said personal safety monitor maintains a list of safety related addresses and is operative to disconnect all voice communications over said personal safety monitor except communication directed to safety related addresses upon receipt of a hazard alarm from any other personal safety monitor in communication therewith.

13. The system for monitoring the safety of personnel on an enterprise site of claim 12, wherein said alarm module of said personal safety monitor monitors the output voltage of the battery during use and is operative to sound an alarm when the output voltage of said battery drops below a predetermined level.

14. The system for monitoring the safety of personnel on an enterprise site of claim 11, wherein said alarm module of said personal safety monitor monitors the output voltage of the battery during use and is operative to sound an alarm when the output voltage of said battery drops below a predetermined level.

15. The system for monitoring the safety of personnel on an enterprise site of claim 14, wherein an emergency call button is provided on said monitor which when depressed and held depressed for at least 2 seconds by the user thereof is operative to initiate an emergency alarm even in the absence of sensor data indicating an alarm situation and initiate:

connection of said monitor to the safety network through a cellular network, if available, connection of said monitor to the mesh network if available; and recording of an optional alarm message from the user to be stored in the monitor's memory for later transmission; and transmission of a pre-recorded emergency message along with said optional alarm message, if recorded, when said monitor can connect to either the cellular network or the mesh network.

16. The system for monitoring the safety of personnel on an enterprise site of claim 5, wherein said emergency call button on said monitor must be depressed and held depressed for at least 5 seconds by the user thereof to initiate an emergency alarm.

17. The system for monitoring the safety of personnel on an enterprise site of claim 1, wherein an emergency call button is provided on said monitor which when depressed and held depressed for at least 2 seconds by the user thereof is operative to initiate an emergency alarm even in the absence of sensor data indicating an alarm situation and initiate:
   connection of said monitor to the safety network through a cellular network, if available,
   connection of said monitor to the mesh network if available; and
   recording of an optional alarm message from the user to be stored in the monitor's memory for later transmission; and
   transmission of a pre-recorded emergency message along with said optional alarm message, if recorded, when said monitor can connect to either the cellular network or the mesh network.

18. The system for monitoring the safety of personnel on an enterprise site of claim 17, wherein said emergency call button on said monitor must be depressed and held depressed for at least 5 seconds by the user thereof to initiate an emergency alarm.

\* \* \* \* \*